US007998282B2

(12) United States Patent
Taniguchi et al.

(10) Patent No.: US 7,998,282 B2
(45) Date of Patent: Aug. 16, 2011

(54) HEAT TREATMENT METHOD OF STEEL COMPONENTS, STEEL COMPONENTS AND MANUFACTURE METHOD OF STEEL COMPONENTS

(75) Inventors: Takao Taniguchi, Anjo (JP); Hisao Shirai, Anjyo (JP); Koji Ohbayashi, Anjo (JP); Kazuaki Okada, Anjo (JP); Hideo Kanisawa, Muroran (JP); Shuji Kozawa, Muroran (JP)

(73) Assignee: AISIN AW Co., Ltd., Anjo (JP)

( * ) Notice: Subject to any disclaimer, the term of this patent is extended or adjusted under 35 U.S.C. 154(b) by 262 days.

(21) Appl. No.: 11/526,684

(22) Filed: Sep. 26, 2006

(65) Prior Publication Data

US 2007/0102068 A1 May 10, 2007

(30) Foreign Application Priority Data

Sep. 26, 2005 (JP) ................................. 2005-278105
Apr. 28, 2006 (WO) .................. PCT/JP2006/308962

(51) Int. Cl.
*C23C 8/00* (2006.01)
*C23C 8/36* (2006.01)
*C23C 8/22* (2006.01)
*C22C 38/22* (2006.01)
*C22C 38/04* (2006.01)

(52) U.S. Cl. ........ 148/233; 148/222; 148/225; 148/319; 420/105; 420/120

(58) Field of Classification Search .................. 148/222, 148/233, 319, 225; 420/105, 120
See application file for complete search history.

(56) References Cited

U.S. PATENT DOCUMENTS 5,783,314 A    7/1998  Yamagiwa et al.
5,788,034 A *  8/1998  Maruki et al. ............... 192/3.29
6,258,179 B1 * 7/2001  Takayama et al. ........... 148/233
2002/0179186 A1 12/2002 Ebihara et al.
2003/0205297 A1 11/2003 Tipps et al.

FOREIGN PATENT DOCUMENTS

| JP | A-62-290860  | 12/1987 |
|----|--------------|---------|
| JP | A-63-149313  | 6/1988  |
| JP | A 5-148535   | 6/1993  |
| JP | A-5-306409   | 11/1993 |
| JP | 07003324 A * | 1/1995  |
| JP | A-7-54038    | 2/1995  |
| JP | 08060236 A * | 3/1996  |
| JP | A 8-311607   | 11/1996 |
| JP | A-10-53809   | 2/1998  |
| JP | A 11-131133  | 5/1999  |
| JP | A-2000-345304| 12/2000 |
| JP | A-2001-303126| 10/2001 |
| JP | A-2002-363726| 12/2002 |
| JP | A-2003-56669 | 2/2003  |
| JP | A-2004-124127| 4/2004  |
| JP | A-2005-29872 | 2/2005  |
| JP | 2005113213 A*| 4/2005  |
| WO | WO 97/00374 A| 1/1997  |

OTHER PUBLICATIONS

Davis et al., ASM Handbook—Surface Hardening of Steels, 1994, ASM International, 10th Edition, vol. 5, 194-196, 259, 264-265, 297.*
Murai et al., JP 07-003324A English machine translation, Jan. 1995.*
Nakajima et al., JP 2005-113213A English machine translation, Apr. 2005.*
Feb. 1, 2011 Office Action issued in Japanese Patent Application No. 2006-257025 (with partial translation).
Feb. 15, 2011 Office Action issued in Japanese Patent Application No. 2007-536571 (with partial translation).
Jul. 1, 2010 Supplementary European Search Report issued in EP 06 81 0452.

* cited by examiner

*Primary Examiner* — Roy King
*Assistant Examiner* — Caitlin Fogarty
(74) *Attorney, Agent, or Firm* — Oliff & Berridge, PLC

(57) ABSTRACT

A method of heat-treating a steel member including carburizing a steel member in a carburizing gas under a reduced pressure. The steel member is then cooled in a cooling gas having a pressure lower than atmospheric pressure. A desired portion of the cooled steel member is then heated using high-density energy. The steel member is then quenched.

25 Claims, 27 Drawing Sheets

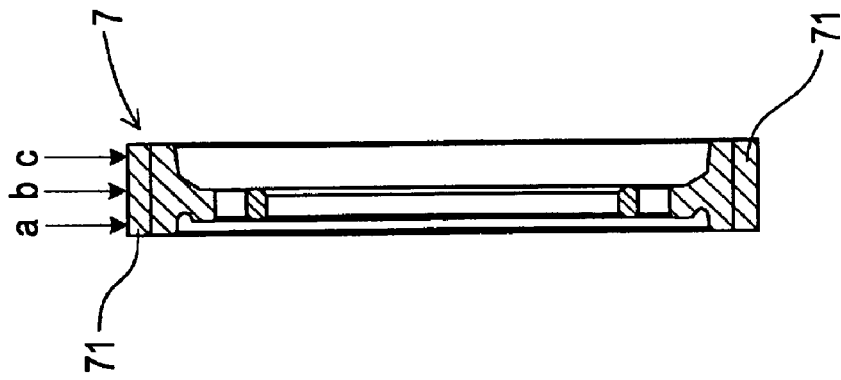
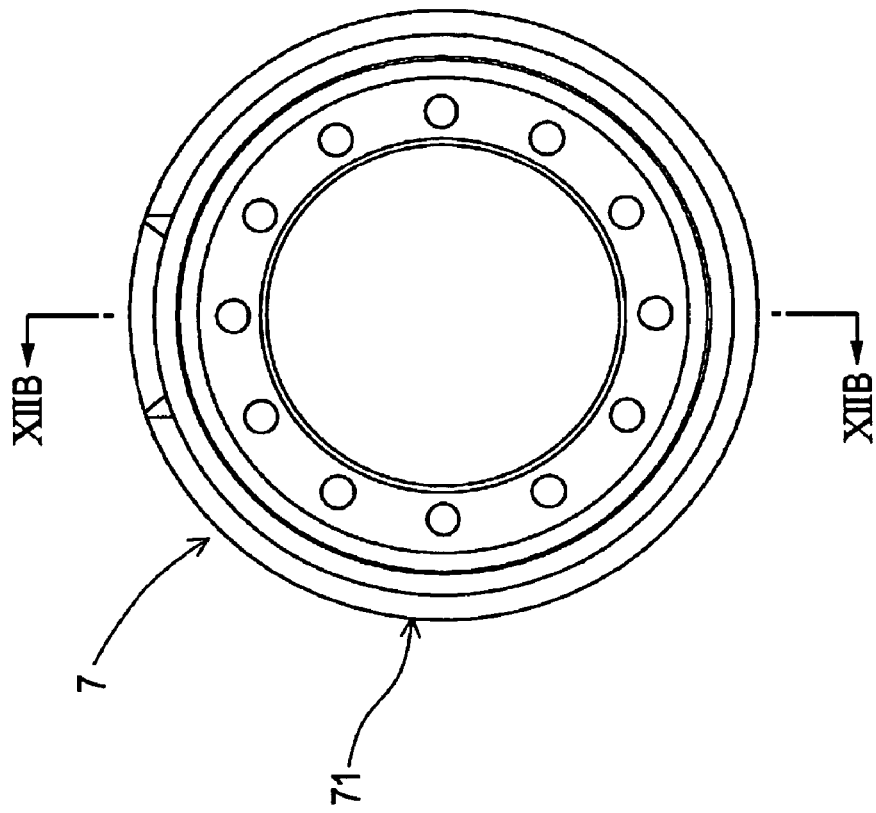

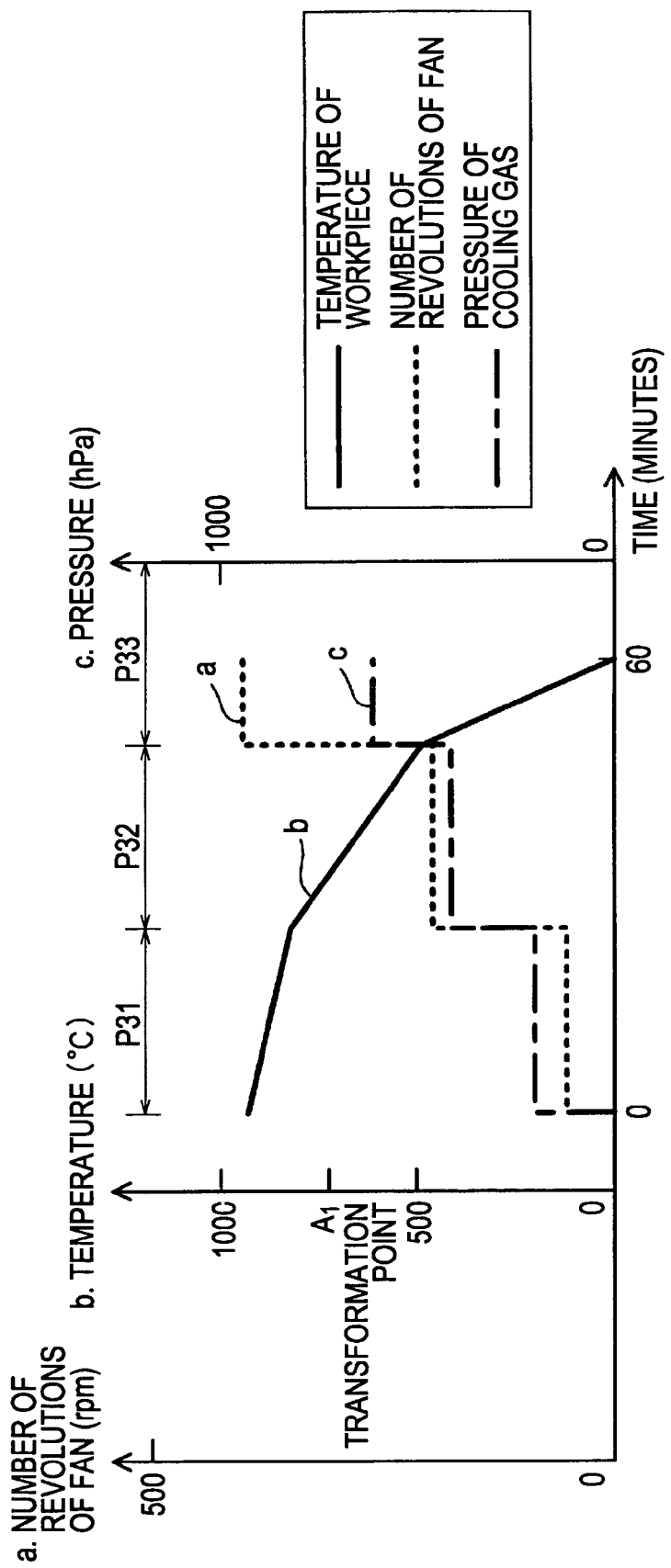

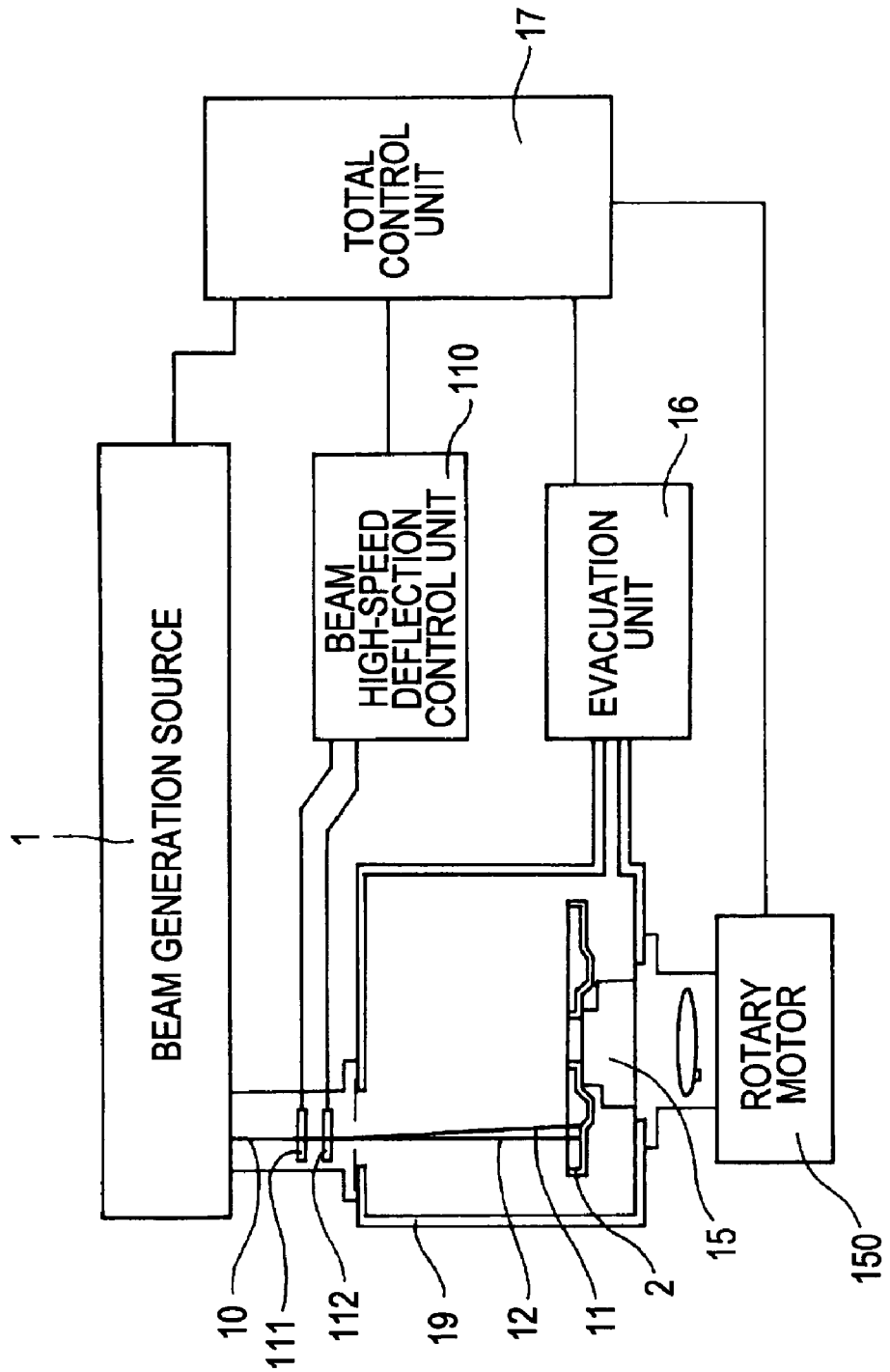

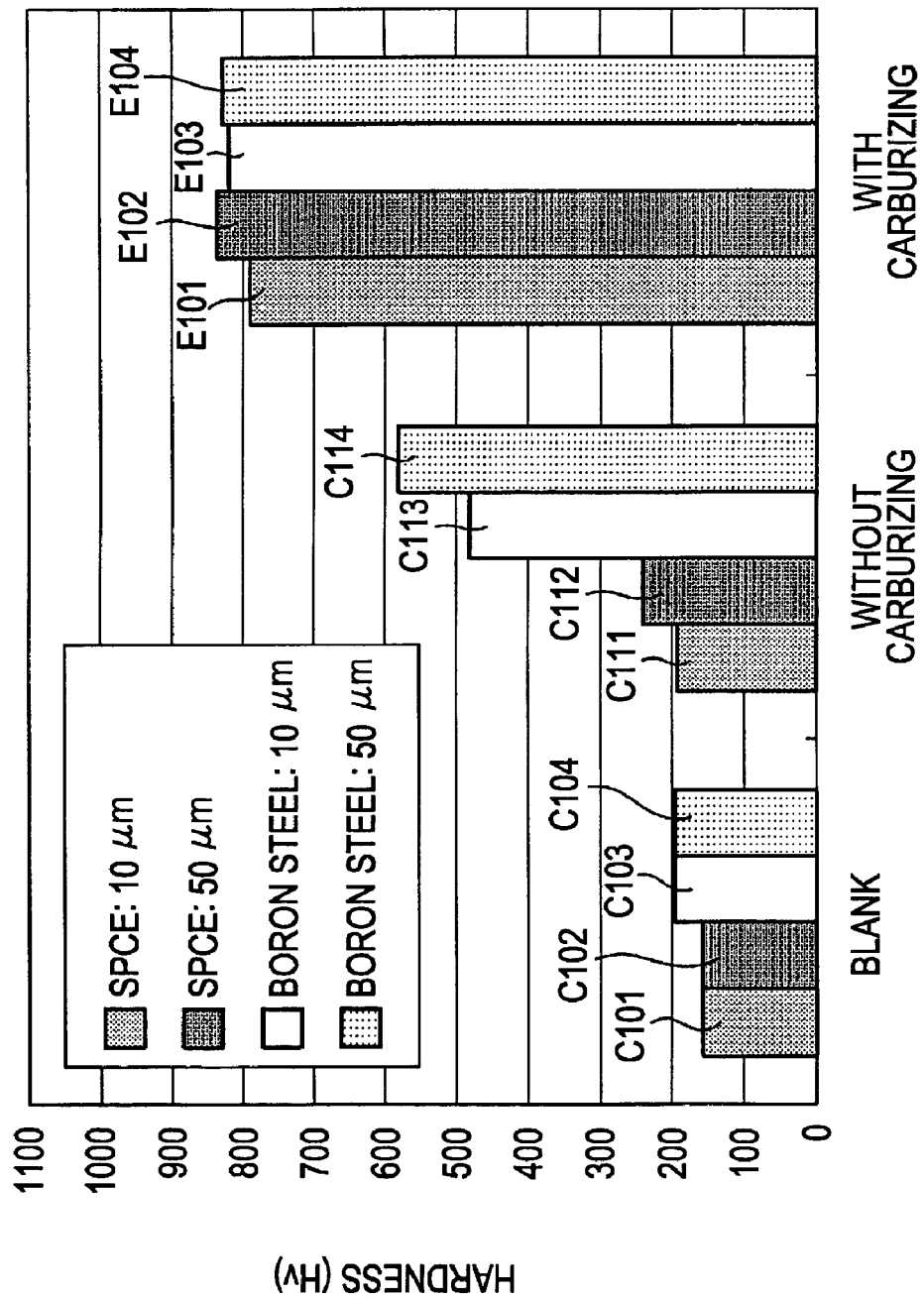

HEAT TREATMENT METHOD OF STEEL COMPONENTS, STEEL COMPONENTS AND MANUFACTURE METHOD OF STEEL COMPONENTS

CROSS-REFERENCE TO RELATED APPLICATIONS

The disclosure of Japanese Patent Application No. 2005-278105 filed on Sep. 26, 2005 and International Patent Application No. PCT/JP06/308962, filed on Apr. 28, 2006, including the specifications, drawings and Abstracts thereof, are incorporated herein by reference in their entirety.

BACKGROUND

The present invention relates to a method of heat-treating a steel member.

In exemplary embodiments, steel members such as gears are often subjected to a carburizing and hardening treatment for increasing surface hardness while maintaining toughness. In the carburizing and hardening treatment, carburization is performed whereby the carbon concentration on the surface of a steel member is increased while the steel member is heated at the austenitizing temperature or higher, and hardening is then performed to ensure the toughness of the core part and to increase surface hardness.

In a known carburizing and hardening treatment, a carburizing treatment is performed for an extended period with a large heat-treating furnace including an oil quenching tank disposed at the outlet side. Oil quenching is then performed immediately after the carburizing treatment. Oil is used as a quenching medium in the hardening treatment because oil allows for relatively mild cooling as compared to water quenching, thereby suppressing the generation of distortions.

Since the known carburizing and hardening treatment requires an extended carburizing treatment using a large heat-treating furnace, the processing time is long and a large amount of energy is consumed. Consequently, it is desirable to reduce the total processing time required for the carburizing and hardening treatment, reduce total energy consumption, and reduce the size of the carburizing and hardening apparatus.

Under these circumstances, a method of induction hardening in which hardening is performed for only a part of the member (see Japanese Unexamined Patent Application Pub. No. 11-131133) may be used as a hardening treatment after the carburizing treatment.

According to the descriptions of Japanese Unexamined Patent Application publication Nos. 5-148535 and 8-311607, members are gradually cooled in a predetermined temperature range at a cooling rate of a predetermined value or less after carburization.

SUMMARY

In known methods, some distortions are generated even when the oil quenching is performed. Accordingly, after carburization and hardening, additional processes such as cutting, grinding, and polishing must be performed for steel members that require high dimensional accuracy. Induction hardening and slow cooling may thus also be employed in order to reduce such distortions. Nonetheless, these known methods fail to satisfactorily prevent distortions for many applications.

Accordingly, exemplary implementations of the broad principles described herein are explained based on examples in which the principles are applied to providing an improved method of heat-treating a steel member in which the generation of distortions can be suppressed and the processing time can be reduced.

Exemplary implementations provide a method of heat-treating a steel member including carburizing a steel member in a carburizing gas under a reduced pressure, cooling the steel member after reduced-pressure carburization in a cooling gas wherein the pressure is reduced to lower than atmospheric pressure, and hardening the steel member by heating a desired part of the cooled steel member using high-density energy and then quenching the steel member.

BRIEF DESCRIPTION OF THE DRAWINGS

Exemplary implementations will now be described with reference to the accompanying drawings, wherein:

FIG. 12A is a plan view of a steel member in Example 3, and FIG. 12B is a cross-sectional view of the steel member (cross-sectional view as viewed along arrows XIIB-XIIB in FIG. 12A) in Example 3;

FIG. 16 is a graph showing a specific example of a reduced-pressure slow-cooling pattern in Example 5;

FIG. 18 is a schematic diagram of an exemplary heat-treatment apparatus in Example 6;

FIG. 32 is a graph showing exemplary measurement results of the hardness in Example 9.

DETAILED DESCRIPTION OF EMBODIMENTS

Figure 1A:
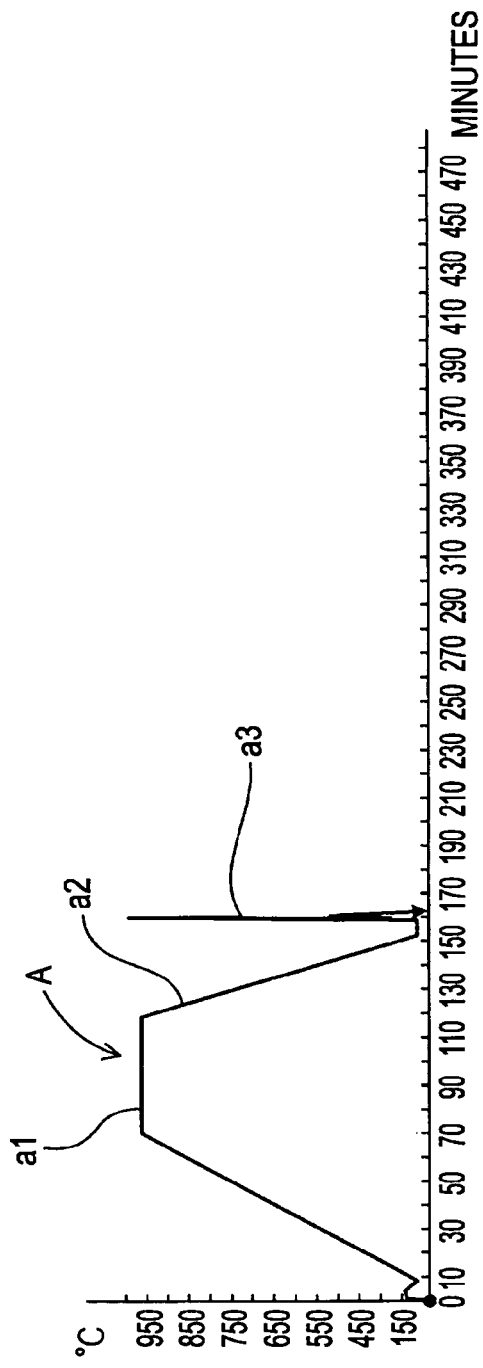
FIG. 1A is a graph showing a heat pattern of a method of the exemplary implementation in Example 1.

The reduced-pressure carburization step in the exemplary implementation is preferably performed by heating a steel member to the austenitizing temperature or higher under a reduced pressure in the range of 0.001 to 0.1 bar. When the pressure during carburization is reduced to less than 0.001 bar, an expensive apparatus is disadvantageously required in order to maintain the degree of vacuum. Alternatively, when the pressure exceeds 0.1 bar, soot may be generated during carburization, resulting in the problem of unevenness of the carburization.

Examples of a carburizing gas include acetylene, propane, butanes, methane, ethylene, and ethane.

During reduced-pressure carburization, a high-concentration carburization in which the surface concentration is increased as compared with that of normal carburizing may be utilized in order to precipitate a compound of iron and carbon on the surface layer. Carbonitriding may also be applied in which a nitriding treatment is performed together with a carburizing treatment.

During hardening, preferably, a desired part of the steel member is heated to the austenitizing temperature, or higher, using high-density energy, and is then quenched. That is, since the use of the high-density energy facilitates local heating, the effect of suppressing distortions can be markedly increased compared with the case where the whole steel member is heated.

The cooling rate of the quenching is preferably in the range of 200 to 2,000° C./sec. At a cooling rate of less than 200° C./sec, a satisfactory hardening effect may not be obtained. On the other hand, it is difficult to realize quenching at a rate of more than 2,000° C./sec.

The heating using high-density energy is preferably performed by high-frequency heating. In such a case, heating can be performed in a non-contact manner with high accuracy by induction heating, and the process efficiency can also be increased.

Any suitable known method can be used for the high-frequency heating.

When high-frequency heating is used, quenching is preferably performed by water quenching. When high-frequency heating is used, only a local part of the member can be heated with high accuracy. Accordingly, even when water quenching is then performed, which has a very strong cooling effect, the generation of quenching distortions can be minimized. Furthermore, because of the excellent quenching effect of water quenching, the hardenability can be increased, and thus the strength of the hardened part can be further increased. Furthermore, the simplification of the carburizing treatment (i.e., the reduction in the processing time) may be realized while increasing the strength of the steel member. That is, even when the thickness of the carburized layer is decreased, a required strength may be achieved. In such a case, the time required for the whole heat-treatment process can be reduced.

During the hardening, preferably, a desired part of the steel member is heated by irradiating a high-density energy beam, and is then quenched by self-cooling. High-density energy beams, such as electron beams and laser beams, can heat an irradiated top surface very quickly. By limiting the heating part to the top surface, when the supply of energy is completed by stopping the irradiation of the high-density energy beam or moving the irradiation source etc., a sufficient quenching effect can be achieved by self-cooling.

The high-density energy beam is preferably an electron beam. In electron beams, for example, the output, the diameter of the irradiation beam, and the irradiation area can be easily changed. Thus, highly accurate heating can be performed so that the accuracy of the heating area is high.

Furthermore, the use of an electron beam can rapidly melt the irradiated part. Therefore, in the hardening step, only the surface layer is preferably heated to the melting point of the steel member, or a higher temperature, by irradiating an electron beam on a desired part of the steel member so as to form a molten part. Subsequently, the molten part is preferably quenched to the martensitic transformation range to form a martensitic structure, thereby forming a hardened layer.

In this case, the hardened layer preferably has a thickness of 0.2 mm or less. When the thickness exceeds 0.2 mm, the effect of the self-cooling after melting may be decreased. On the other hand, an excessively thin hardened layer may cause a problem in durability. Accordingly, the thickness of the hardened layer is preferably in the range of 0.1 to 0.2 mm.

Reduced-pressure cooling step may be performed for the steel member after the reduced-pressure carburization step, but need not be continued until the cooling is completed. After the temperature is decreased to at least a temperature that negligibly affects the generation of distortions, the reduced-pressure cooling step need not be performed. Alternatively, the cooling may be performed at an atmospheric pressure in which the reduced pressure is released, or at a pressurized state in which the pressure is positively increased to more than atmospheric pressure.

During reduced-pressure cooling, the reduced pressure may be released in the course of the step, or the stirring condition may also be changed. From an industrial standpoint, the conditions are preferably changed so as to increase the cooling efficiency in a low-temperature range in which the possibility of the generation of distortions is decreased.

The timing of the completion of the cooling step can be controlled by the temperature of the steel member or the cooling time. The optimum conditions for the timing are changed in accordance with the type of steel member, the number of steel members processed in a batch, the type of cooling gas, the capacity of a stirring unit of the cooling gas, and the like. Therefore, preferably, control values are determined on the basis of experiments, and the timing is determined by following the control values.

When the timing of the completion of the reduced-pressure cooling step is determined by the temperature, for example, the step can be completed when the temperature is decreased to a predetermined temperature of 500° C. or lower. When the temperature is gradually decreased to at least 500° C. under conditions in which the generation of distortions can be suppressed, the above-described operations and advantages can be satisfactorily achieved.

During the reduced-pressure cooling step, even when the cooling gas under a reduced pressure is not stirred, the effect of suppressing distortions is higher than that when the cooling gas is under atmospheric pressure. However, more preferably, the retention of the cooling gas is prevented by appropriately stirring.

That is, the reduced-pressure cooling step is preferably performed while stirring the cooling gas while the pressure of the cooling gas is reduced to lower than atmospheric pressure. Consequently, the effect of suppressing distortions can be further increased.

The reduced-pressure cooling step is preferably performed at least from a time before a structural transformation of the steel member occurs due to cooling, to the time when structural transformation is completed. When a steel member is cooled from a temperature at which the steel member is in the austenitic state to room temperature, a structural transformation always occurs. Distortions are easily generated during this structural transformation. In particular, when the cooling conditions vary during structural transformation, distortions are easily generated. Therefore, the structural transformation of the steel member is preferably completed during the reduced-pressure cooling step.

The pressure of the cooling gas during the reduced-pressure cooling step may be reduced to, preferably, the range of 0.1 to 0.65 bar. In order to achieve a reduced pressure of less than 0.1 bar, a very expensive pressure-reducing unit is disadvantageously required. On the other hand, when the pressure exceeds 0.65 bar, the above operations and advantages achieved by the reduction in the pressure of the cooling gas are decreased.

Therefore, the pressure of the cooling gas during cooling is more preferably in the range of 0.1 to 0.3 bar. In particular, when the pressure of the cooling gas is reduced to 0.3 bar or less, the above effect due to the pressure reduction can be increased.

Cooling efficiency can be increased by increasing the stirring rate of the cooling gas after the temperature of the steel member is decreased to the $A_1$ transformation point or lower. Since cooling is performed under a reduced pressure, the cooling efficiency is lower than the case in which cooling is performed at atmospheric pressure or higher. Accordingly, after the temperature is decreased to the $A_1$ transformation point at which the temperature of the steel member does not affect the generation of distortions or lower, the cooling efficiency can be improved by increasing the stirring rate of the cooling gas, though this improvement may be slight. In the simplest method, the stirring rate may be set to zero or the minimum rate in the initial stage of cooling, and is then increased after the temperature of the steel member is decreased to the $A_1$ transformation point or lower. Accordingly, cooling capacity can be improved after the temperature of the steel member is decreased to the $A_1$ transformation point or lower, and thus the whole cooling time can be reduced. In such a case, the stirring rate may be increased at once, but is preferably increased gradually.

Cooling can also be performed while the pressure of the cooling gas is increased after the temperature of the steel member is decreased to the $A_1$ transformation point or lower. In such a case, after the temperature is decreased to the $A_1$ transformation point at which the temperature of the steel member does not affect the generation of distortions or lower, the cooling rate can be increased by increasing the pressure of the cooling gas, and thus the whole cooling time can be reduced. The method of increasing the pressure of the cooling gas may be combined with the method of increasing the stirring rate.

The increase in pressure during cooling may be performed in a pressure range lower than atmospheric pressure. The pressure may be increased at once, but is preferably increased gradually. As described above, after the completion of cooling, the pressure may be increased to atmospheric pressure or higher.

Furthermore, during cooling, various other types of gas which are different from the carburizing gas used in the carburization can be used as the cooling gas. In particular, the cooling gas is preferably nitrogen gas ($N_2$ gas). In this case, cooling can be performed while oxidation of the steel member is suppressed.

Various types of known gas can be selected as the cooling gas in accordance with the quality required for the steel member.

The steel member is preferably composed of a non-heat-treated steel in which the mechanical strength or the hardness is obtained by precipitation hardening of vanadium carbonitride or transformation strengthening of a bainitic structure after carburization and cooling. The advantages achieved by the application of the heat-treatment method of the exemplary implementation can be effectively obtained when the so-called non-heat-treated steel is used.

The steel member is preferably composed of a non-heat-treated steel, in which the hardness of the inside of the member in which the effect of carburizing does not reach, is increased to about 50 to 150 Vickers hardness Hv after carburization and cooling. That is, in the non-heat-treated steel used, the difference between the Vickers hardness of the steel member before carburization and cooling, and the Vickers hardness of the steel member after these steps, is preferably in the range of 50 to 150 Hv. The use of such a non-heat-treated steel can easily provide a strength characteristic that is the same as or higher than the case in which a known steel is carburized and hardened by a known method.

Specifically, steels having the following chemical components can be used as the non-heat-treated steel.

Non-heat-treated steels containing, as chemical components of the steel member, 0.1% to 0.6% of carbon (C), 0.1% to 0.6% of silicon (Si), 0.5% to 3.0% of manganese (Mn), 0.1% to 2.0% of chromium (Cr), 0% to 0.3% of molybdenum (Mo), 0% to 0.3% of vanadium (V), and 0% to 0.05% of sulfur (S) in terms of mass percent, the balance being iron (Fe), and inevitable impurities (hereinafter referred to as "base steels").

As described above, the C content is preferably in the range of 0.1% to 0.6%. When the C content is less than 0.1%, a carbonitride is not sufficiently produced. However, when the C content exceeds 0.6%, the hardness is very high, resulting in a problem of degradation in the cutting workability.

The Si content is preferably in the range of 0.1% to 0.6%. Si has an effect of improving the pitting life of gears by improving the resistance to temper softening of the hardened layer. When the Si content is less than 0.1%, the effect is not satisfactory. However, in order to prevent the degradation of the carburizing property, the amount of Si added is preferably not in excess of 0.6%.

The Mn content is preferably in the range of 0.5% to 3.0%. Mn is an element that is effective for improving the hardenability. A Mn content of 0.5% or more can provide this effect. However, when the Mn content exceeds 3.0%, a martensitic structure is formed in the structure of the core part, and thus distortions may be increased.

The Cr content is preferably in the range of 0.1% to 2.0%. When the Cr content is 0.1% or more, the resistance to temper softening of the hardened layer can be improved. However, when the Cr content exceeds 2.0%, a degradation of toughness due to the formation of chromium carbides may occur.

The Mo content is preferably in the range of 0% to 0.3%. The addition of Mo is not essential. The addition of Mo is advantageous in that the strength of the hardened layer is increased to improve the bending fatigue strength. In order to obtain this effect, the Mo content is preferably 0.01% or more. However, when Mo is added in an amount of more than 0.3%, the effect is saturated. Therefore, the upper limit of the Mo content is preferably 0.3%.

The V content is preferably in the range of 0% to 0.3%. The addition of V is not essential, but the addition of V can provide precipitation hardening of a carbonitride or the effect of transformation strengthening of a bainitic structure to strengthen the steel. In order to obtain the effect, the addition of 0.01% of V is necessary. However, when the V content exceeds 0.3%, the effect is saturated, and the economical efficiency may be impaired.

The S content is preferably in the range of 0% to 0.05%. The addition of S is not essential, but in order to improve the machinability, S is preferably added in an amount of 0.005% or more. However, since the addition of S in an amount of more than 0.05% degrades the forgeability, the S content is preferably 0.05% or less.

More preferred non-heat-treated steels include non-heat-treated steels containing, as chemical components of the steel member: 0.22% to 0.26% of C, 0.15% to 0.35% of Si, 1.40% to 1.60% of Mn, 0.40% to 0.60% of Cr, 0% to 0.3% of Mo, 0% to 0.3% of V, and 0% to 0.05% of S in terms of mass percent, the balance being Fe and inevitable impurities.

Furthermore, non-heat-treated steels containing, as chemical components of the steel member, 0.11% to 0.15% of C, 0.15% to 0.35% of Si, 2.10% to 2.30% of Mn, 0.90% to 1.10% of Cr, 0% to 0.3% of Mo, 0% to 0.3% of V, and 0% to 0.05% of S in terms of mass percent, the balance being Fe and inevitable impurities, can also be preferably used.

Furthermore, non-heat-treated steels containing, as chemical components of the steel member, 0.2% to 0.3% of C, 0.2% to 0.6% of Si, 1.4% to 2.0% of Mn, 0.2% to 0.6% of Cr, 0% to 0.4% of Mo, 0.05% to 0.25% of V, and 0% to 0.05% of S in terms of mass percent, the balance being Fe and inevitable impurities, can also be used.

In addition, non-heat-treated steels containing, as chemical components of the steel member, 0.2% to 0.3% of C, 0.4% to 0.6% of Si, 1.4% to 2.0% of Mn, 0.4% to 0.6% of Cr, 0.3% to 0.4% of Mo, 0.05% to 0.25% of V, and 0% to 0.05% of S in terms of mass percent, the balance being Fe and inevitable impurities, can also be preferably used.

In addition, non-heat-treated steels containing, as chemical components of the steel member, 0.2% to 0.3% of C, 0.4% to 0.6% of Si, 1.4% to 2.0% of Mn, 0.4% to 0.6% of Cr, 0.3% to 0.4% of Mo, 0.05% to 0.25% of V, and 0% to 0.05% of S in terms of mass percent, the balance being Fe and inevitable impurities, can also be preferably used.

These non-heat-treated steels are steels in which the chemical components of the above-described base steels are further limited so that the effects obtained by adding the individual elements are exhibited more specifically. That is, preferably, the C content is further limited to the range of 0.22% to 0.26%, 0.11% to 0.15%, or 0.2% to 0.3%. By limiting the C content to one of these ranges, the strength of the core part can be more reliably ensured, and decreases in toughness and machinability can be more reliably suppressed.

The Si content is more preferably limited to the range of 0.15% to 0.35%, 0.2% to 0.6%, or 0.4% to 0.6%. By limiting the Si content to one of these ranges, the resistance to temper softening of the hardened layer can be more reliably improved, and degradation in the carburizing property can be more reliably suppressed.

Preferably, the Mn content is further limited to the range of 1.40% to 1.60%, 2.10% to 2.30%, or 1.4% to 2.0%. By limiting the Mn content to one of these ranges, the hardenability and the resistance to temper softening can be more reliably improved, and the formation of martensitic structure can be more reliably suppressed.

The Cr content is preferably limited to the range of 0.40% to 0.60%, 0.90% to 1.00%, 0.2% to 0.6%, or 0.4% to 0.6%. By limiting the Cr content to one of these ranges, the hardenability and the resistance to temper softening can be more reliably improved, and the degradation of toughness due to the formation of chromium carbides can be more reliably suppressed.

The Mo content is preferably limited to the range of 0% to 0.3%, 0% to 0.1%, or 0.3% to 0.4%. By limiting the Mo content to one of these ranges, a decrease in the economical efficiency can be further suppressed.

The V content is preferably limited to the range of 0.01% to 0.3% or 0.05% to 0.25%. By limiting the V content to one of these ranges, the effect of forming a fine structure can be more reliably obtained.

Instead of the above-described non-heat-treated steels, for example, steels standardized by JIS, such as S15C, S20C, S35C, S45C, SCM415, SCM420, SCM440, SCr415, SCr420, SCr440, and SNCM220, which are used as steels for machine structural use, can also be used.

When the steel member is a part of the driving system of an automobile, the above heat-treatment method is particularly effective. Examples of the parts of the driving system of an automobile involved include gears, ring-shaped members, and other parts of an automatic transmission. These parts require both a local high-strength characteristic and high dimensional accuracy. Accordingly, the application of the above-described improved heat-treatment method can realize the rationalization of the production process, a reduction in the cost, and an improvement in the quality of the products.

The steel member may be, for example, a lock-up clutch piston that is installed, together with springs, in a lock-up clutch unit in a torque converter. The lock-up clutch piston includes a disc-shaped flat plate part and a cylindrical part projecting from the flat plate part in the axial direction. A hardened layer for suppressing abrasion caused by sliding of the flat plate part and the projecting part over the springs can be formed on the flat plate part and the projecting part by performing the hardening step.

The hardened layer can be formed, for example, at appropriate positions of the lock-up clutch piston by performing the above-described carburization and cooling, and then locally performing hardening. That is, the resulting lock-up clutch piston includes the hardened layer on the flat plate part and the projecting part. Therefore, the lock-up clutch piston includes a sliding part having excellent abrasion resistance and has excellent durability. Furthermore, since areas other than the hardened layer are not transformed to martensite, these areas have satisfactory processability. Accordingly, the lock-up clutch piston produced by an exemplary implementation is a member that locally includes abrasion-resistant areas and that also has excellent processability.

Furthermore, the hardened layer provided on the lock-up clutch piston has a very small thickness, and the high-density energy negligibly affects the areas other than the surface treatment areas (hardened layer). Consequently, the outer dimensions of the lock-up clutch piston can be maintained with high accuracy. Accordingly, the lock-up clutch piston can be installed in a torque converter without performing an additional step of removing distortions, and thus production cost of the torque converter can also be reduced.

As described above, an electron beam is most preferably used as the high-density energy because the heat-treatment areas can be accurately controlled.

In the steel member produced by performing the method of heat-treating in the exemplary implementation, the residual stress of the top surface can be a compressive residual stress in the range of 200 to 1,500 MPa. For example, by performing high-frequency heating, followed by water quenching, a high compressive residual stress within the above range, which is higher than that obtained by a known carburizing and hardening treatment, can be achieved. Because of this high compressive residual stress in the range of 200 to 1,500 MPa, the bending fatigue strength and the like can be improved as compared with those obtained by known methods.

Additionally, in the case of reduced-pressure carburization and reduced-pressure slow cooling being continuously performed, a reduced-pressure carburization chamber and a reduced-pressure slow cooling chamber can be directly connected in a production apparatus. Therefore, for example, a preliminary chamber for adjusting the degree of reduced pressure need not be provided therebetween. That is, since both carburization and slow cooling are performed under a reduced pressure, the difference in pressure between these two steps can be reduced. Accordingly, products obtained after the carburization can be subjected to cooling without being exposed to atmospheric pressure, thus performing an efficient treatment in which the generation of distortions can be suppressed.

Another exemplary aspect of the implementation described herein provides a steel member produced by performing the heat treatment according to the method of heat-treating a steel member of the first exemplary implementation.

An additional exemplary aspect of the implementation described herein includes a method of producing a steel member including forming a steel member into a desired shape, and then performing the heat-treatment method of the first exemplary implementation. Various known forming methods, such as press working, can be employed as the forming step.

EXAMPLES

Example 1

A method of heat-treating a steel member according an example of an exemplary implementation will now be described with reference to FIGS. 1A-6.

Figure 3A:
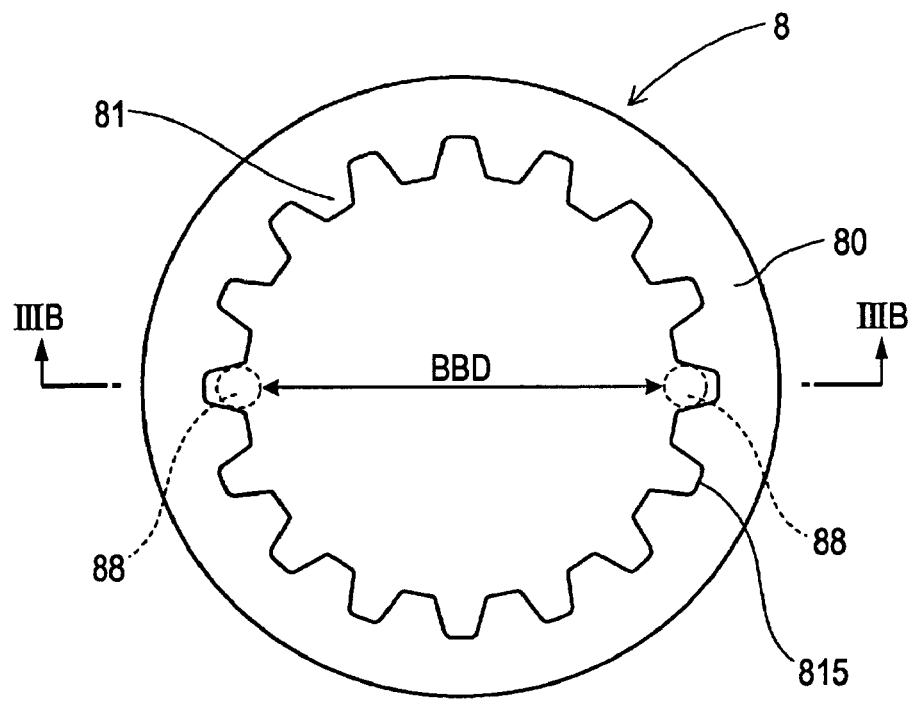
FIG. 3A is a plan view of a steel member in Example 1.
Figure 3B:
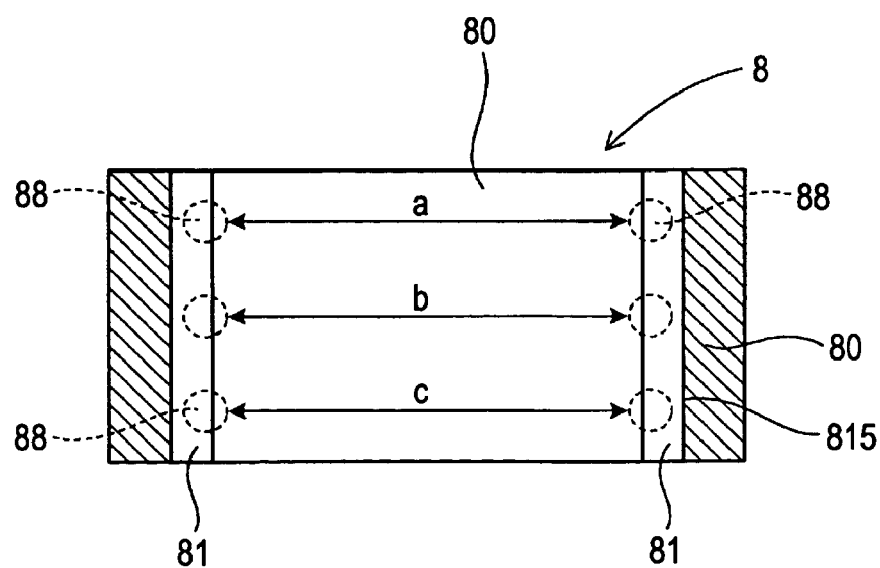
FIG. 3B is a cross-sectional view of the steel member (cross-sectional view as viewed along arrows IIIB-IIIB in FIG. 3A) in Example 1.

In this example, a heat-treatment method of an exemplary implementation and a known carburizing and hardening method for comparison (comparative method) were performed using a ring-shaped steel member 8 (ring gear) used as a part of an automatic transmission, and the generation of distortions and the like were evaluated. As shown in FIGS. 3A and 3B, the steel member 8 processed in this example includes a tooth flank 81 provided in the inner peripheral surface of a cylindrical main body 80. In the steel member 8, the tooth flank has a high hardness, and the circularity of the member is very important.

Figure 1B:
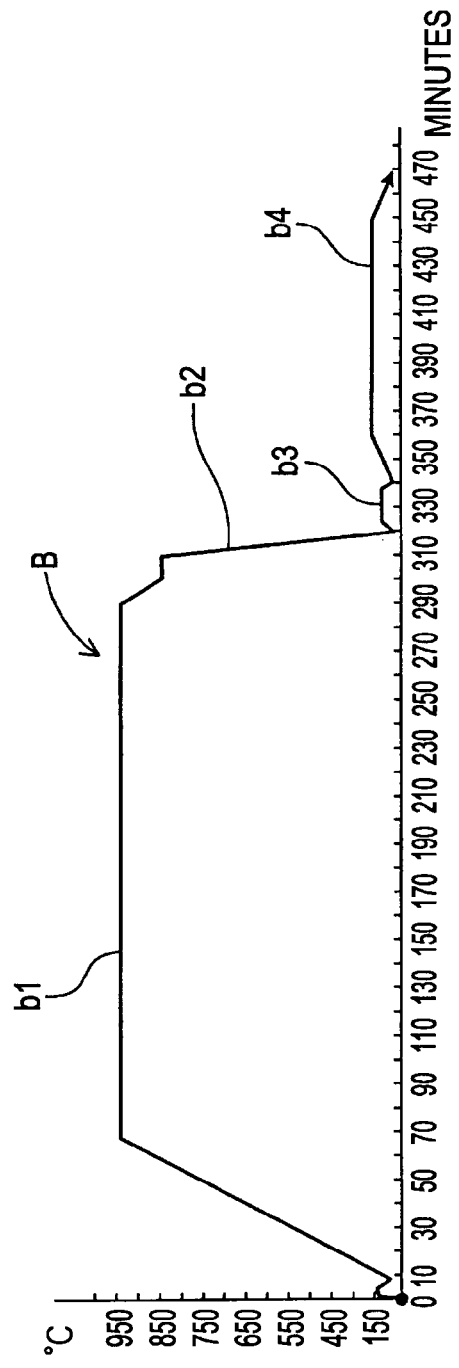
FIG. 1B is a graph showing a heat pattern of a comparative method in Example 1.

First, as shown in FIGS. 1A and 1B, a heat pattern A in the method of an exemplary implementation is compared with a heat pattern B in the comparative method. In the FIGS. 1A and 1B, the abscissa represents the time and the ordinate represents the temperature, and the temperatures of the steel member during heat treatment are represented as the heat patterns A and B.

As shown in the heat pattern A in the figure, in the method of the present invention, the temperature was increased to 950° C., which was the carburizing temperature, and the temperature was then maintained at 950° C. for 49 minutes to perform a reduced-pressure carburization step a1; the temperature was then decreased to 150° C. or lower over a period of 40 minutes under a reduced pressure to perform a reduced-pressure cooling step a2; and the temperature was rapidly increased again to 950° C., which was the hardening temperature, by high-frequency heating, and water quenching was then carried out to perform an induction hardening step a3.

In contrast, as shown in the heat pattern B in the figure, in the comparative method, the temperature was increased to 950° C., which was the carburizing temperature, and the temperature was then maintained at 950° C. for 220 minutes to perform a normal carburization step b1; and the temperature was then maintained at 850° C., which was the hardening temperature, and oil quenching was then carried out to perform a hardening step b2. In the comparative method, a post-washing step b3 of washing away the quenching medium (oil), adhered during the oil quenching, and a tempering step, b4 for the purpose of obtaining a satisfactory toughness of the quench-hardened layer, were also performed. The temperature was somewhat increased during these steps. Evaluations of distortions, strength, and residual stress, which will be described below, were performed using samples obtained after the tempering step b4.

A heat-treatment apparatus 5 used in the method of an exemplary implementation and a carburizing and hardening apparatus 9 used in the comparative method will be briefly described below.

Figure 2A:
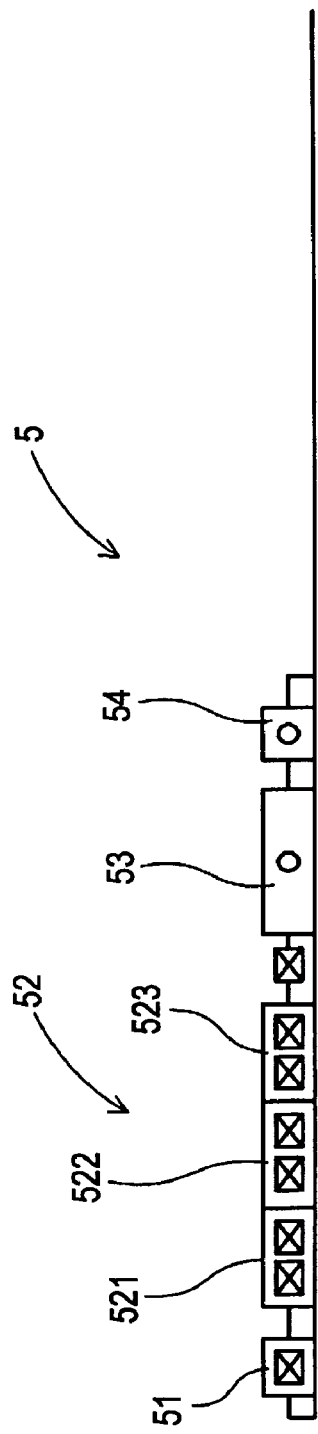
FIG. 2A is a schematic view showing a heat-treatment apparatus for performing the method of the exemplary implementation in Example 1.

As shown in FIG. 2A, the heat-treatment apparatus 5 used in the an exemplary implementation includes a pre-washing tank 51 for washing steel members before carburizing and hardening; a reduced-pressure carburizing and slow cooling unit 52 equipped with a heating chamber 521, a reduced-pressure carburization chamber 522, and a reduced-pressure cooling chamber 523; an induction hardening unit 53; and a magnetic flaw detector 54 for checking defects.

Figure 2B:
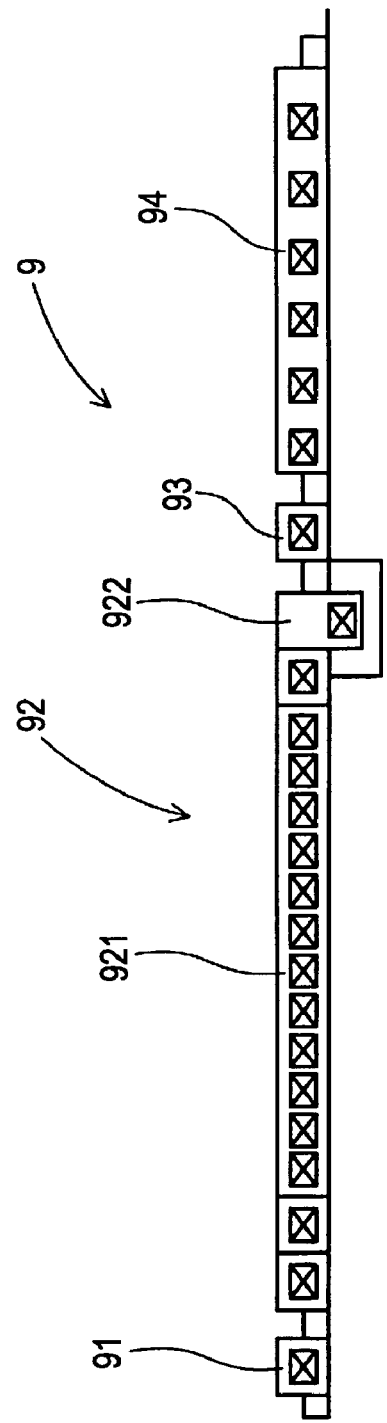
FIG. 2B is a schematic view showing a carburizing and hardening apparatus for performing the comparative method in Example 1.

As shown in FIG. 2B, the carburizing and hardening apparatus 9 used in the comparative method includes a pre-washing tank 91 for washing steel members before a carburizing and hardening treatment; a long carburizing furnace 92 equipped with a carburizing furnace 921 for performing heating, carburizing, and diffusion, and a quenching oil tank 922; a post-washing tank 93 for washing the steel members after the carburizing and hardening; and a tempering furnace 94 for performing a tempering treatment.

Carburizing and hardening of the steel member 8 were performed using the above apparatuses, and a strength characteristic, results of the generation of distortions, and results of the generation of residual stresses were compared.

In the method of the exemplary implementation, as shown in the heat pattern A in FIG. 1A, carburization a1 of the steel member in a carburizing gas under a reduced pressure, the reduced-pressure cooling step a2 of cooling the steel member after carburization in a cooling gas whose pressure is reduced to lower than atmospheric pressure, and induction hardening a3 while performing high-frequency heating of a desired part of the cooled steel member and then water-quenching the steel member were performed.

During carburization a1, a heat treatment was performed at 950° C. for 49 minutes as a carburizing and diffusion treatment. In this step, the degree of vacuum of the carburization chamber was 0.001 bar, and the type of the carburizing gas was acetylene. In the cooling step a2, the cooling gas was nitrogen ($N_2$), the degree of vacuum was 0.2 bar, and the cooling gas was stirred. During cooling, the temperature was decreased from a temperature of the austenitizing temperature or higher immediately after carburizing to a temperature of 150° C. or lower at a cooling rate of 10° C./min. During induction hardening a3, the tooth flank 81, which is the inner peripheral part of the steel member 8, was heated to 950° C. by high-frequency heating, and the steel member 8 was then subjected to water quenching by spraying water. The cooling rate by the water quenching was 268° C./sec.

In the comparative method, as shown in the heat pattern B in FIG. 1B, the temperature was increased to 950° C., which was the carburizing temperature, and the temperature was then maintained at 950° C. for 220 minutes to perform the normal carburization step b1; and the temperature was then maintained at 850° C., which was the hardening temperature, and oil quenching was then carried out to perform the hardening step b2. In this comparative example, the post-washing b3 step was performed after the hardening step b2, and the tempering step b4 was performed after the post-washing step b3.

In the above comparative method, SCM420 (JIS) suitable for carburization was used as the blank.

In the method of the exemplary implementation, instead of the SCM420 (JIS) suitable for carburization, a non-heat-treated steel containing, as chemical components, 0.22% to 0.26% of C, 0.15% to 0.35% of Si, 1.40% to 1.60% of Mn, 0.40% to 0.60% of Cr, 0% to 0.3% of Mo, 0% to 0.3% of V, and 0% to 0.05% of S in terms of mass percent, the balance being Fe and inevitable impurities, was used as the blank. More specifically, a non-heat-treated steel (Sample E1) containing 0.23% of C, 0.22% of Si, 1.45% of Mn, 0.46% of Cr, 0.17% of Mo, 0.09% of V, and 0.016% of S in terms of mass percent, the balance being Fe and inevitable impurities, was used as the blank.

Figure 4:
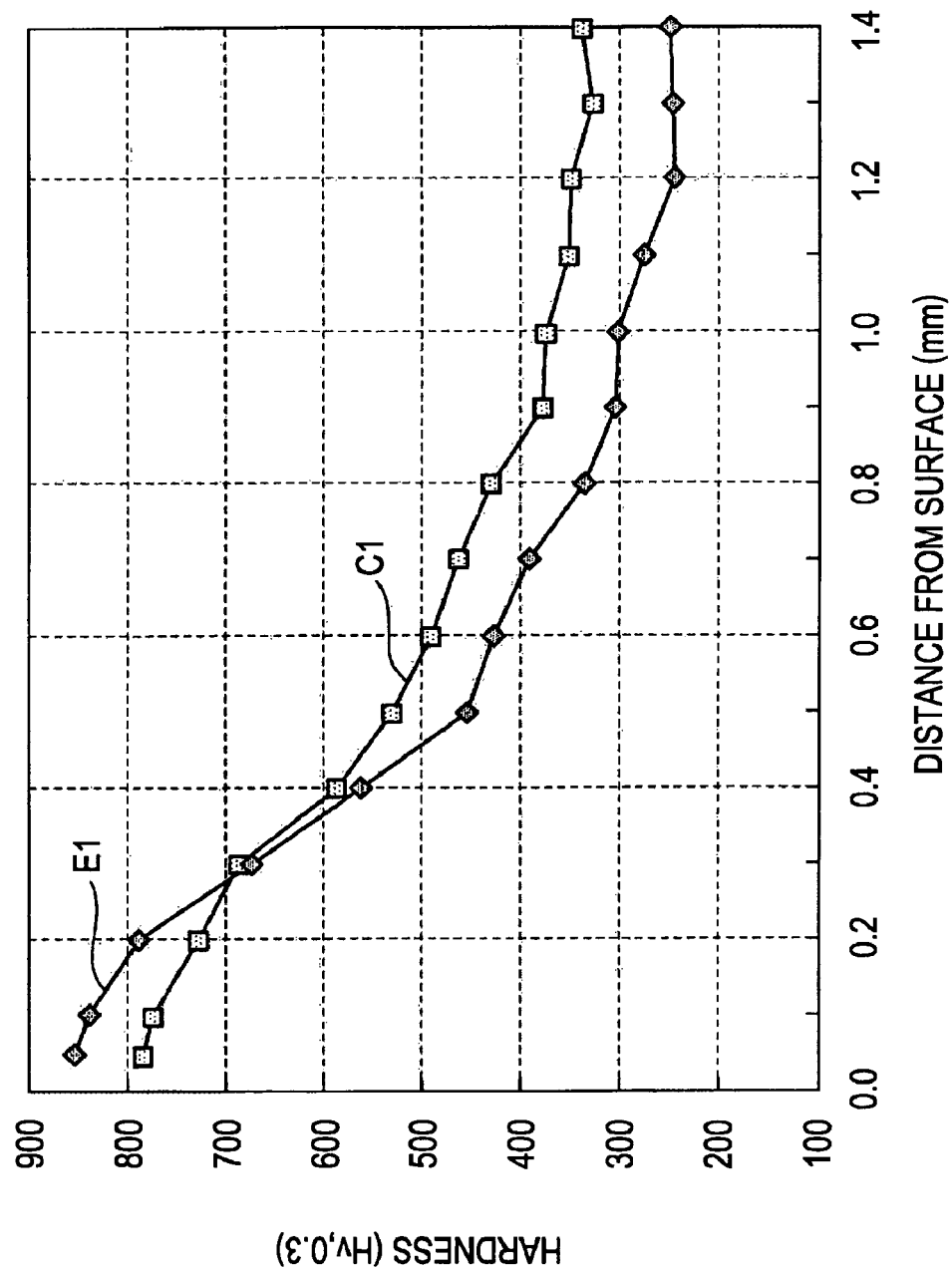
FIG. 4 is a graph showing exemplary hardness distributions after carburizing and hardening in Example 1.

The relationship between the Vickers hardness (Hv) and the distance from the surface of a bottom part 815 FIGS. 3A and 3B of the gear was determined using the steel member obtained after carburizing and hardening to evaluate the strength. FIG. 4 shows the measurement results. In the figure, the abscissa represents the distance (mm) from the surface, and the ordinate represents the Vickers hardness (Hv). The results of the steel member processed by the method of an exemplary implementation are denoted by E1, and the results of the steel member processed by the comparative method are denoted by C1.

As shown in the figure, as the measurement position is shifted to the inside, the hardness of the steel member obtained by the method of an exemplary implementation (E1) is somewhat lower than that obtained by the comparative method (C1). However, on the top surface, the hardness of the steel member obtained by the method of an exemplary implementation is higher than that obtained by the comparative method. These results show that, by employing an exemplary method, excellent heat treatment that is the same as or superior to known methods can be performed.

In an exemplary implementation (E1), if the same material suitable for carburizing as that used in the known method is used, the strength may be decreased because of a decrease in the carburized depth corresponding to the significant reduction in the carburizing time. However, the problem related to the strength could be eliminated by changing the material used and employing water quenching. The internal strength may be improved to the same level as that of known products by improving the components of the blank.

Dimensions of the steel members after carburizing and hardening were measured to compare the amounts of distortion.

Two types of dimensional measurements, i.e., "BBD" and "BBD ellipse" were performed. The "BBD" is a dimension measured as follows: As shown in FIG. 3A, steel balls 88 having a predetermined diameter are disposed so as to be in contact with recesses of the tooth flank 81, and the inner diameter between the facing steel balls 88 was measured. This measurement was performed over the circumference and at three positions (position a, position b, and position c in FIG. 3B)) disposed in the axial direction. The average (Ave), the maximum (Max), and the minimum (Min) of the measured values were calculated.

The difference between the maximum and the minimum of the above "BBD" in each measurement position in the axial direction was then calculated as "BBD ellipse (μm)". Similarly, the average (Ave), the maximum (Max), and the minimum (Min) thereof were calculated.

Figure 5:
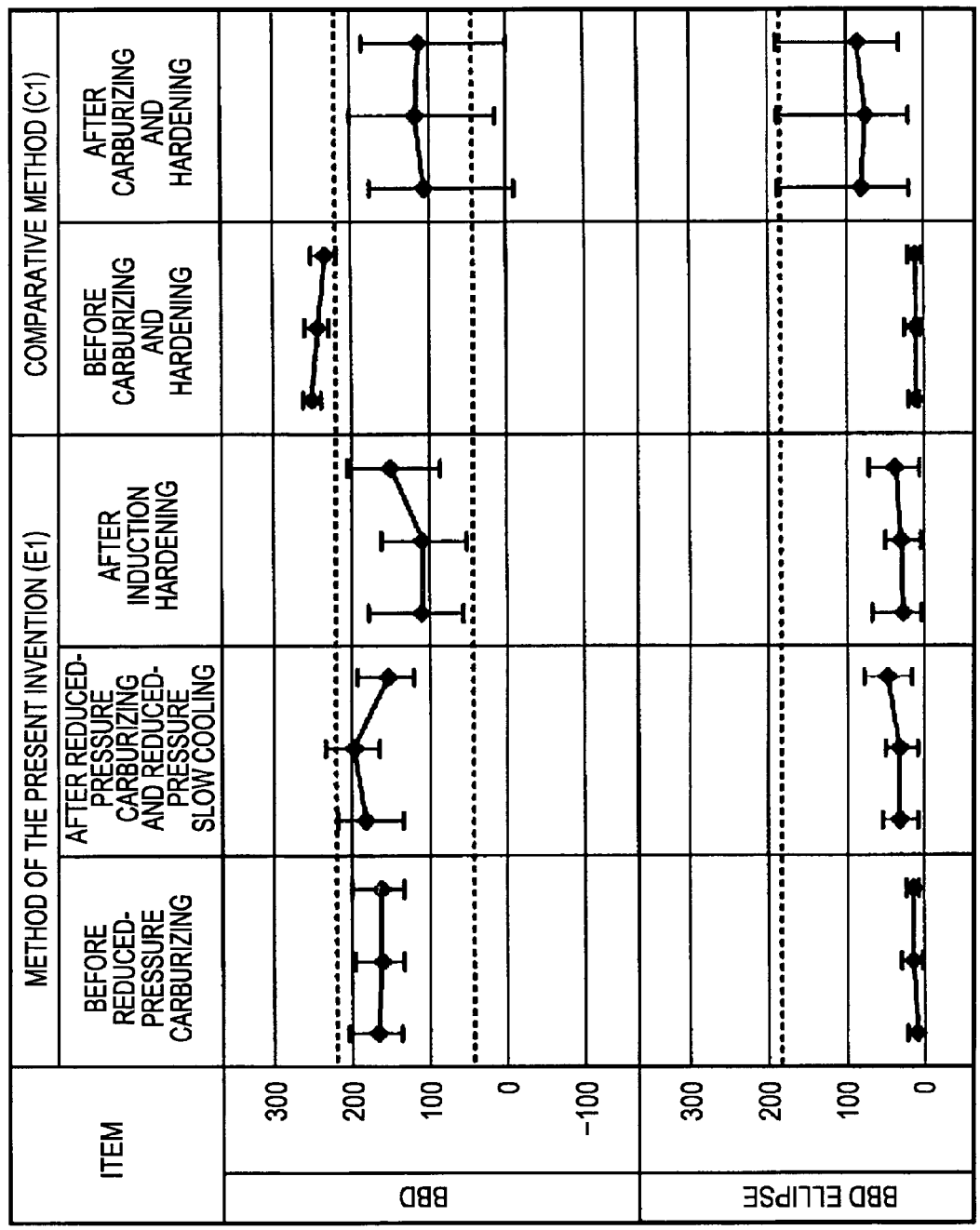
FIG. 5 illustrates graphs showing exemplary results of the generation of distortions in Example 1.

FIG. 5 shows the measurement results of the "BBD" and the "BBD ellipse". In the left columns in the figure, as the results of an exemplary implementation, the results at three timings, namely, before carburizing, after carburizing and cooling, and after induction hardening are shown. In the right columns in the figure, as the results of the comparative method, the results at two timings, namely, before carburizing and hardening, and after carburizing and hardening are shown. Regarding the notation in each column, the maximum, the minimum, and the average at each position are plotted, from the left, in the order of position a, position b, and position c in FIG. 3B, and the maximum and the minimum are vertically joined by the thick line. The averages at the three positions are joined by the thin line.

As is apparent from the figure, the use of an exemplary implementation can suppress the generation of distortions even after hardening. The results also show that the effect of suppressing the generation of distortions is achieved by the reduced-pressure slow cooling after the reduced-pressure carburizing.

In contrast, in the comparative example, large distortions are generated by carburizing and hardening.

Figure 6:
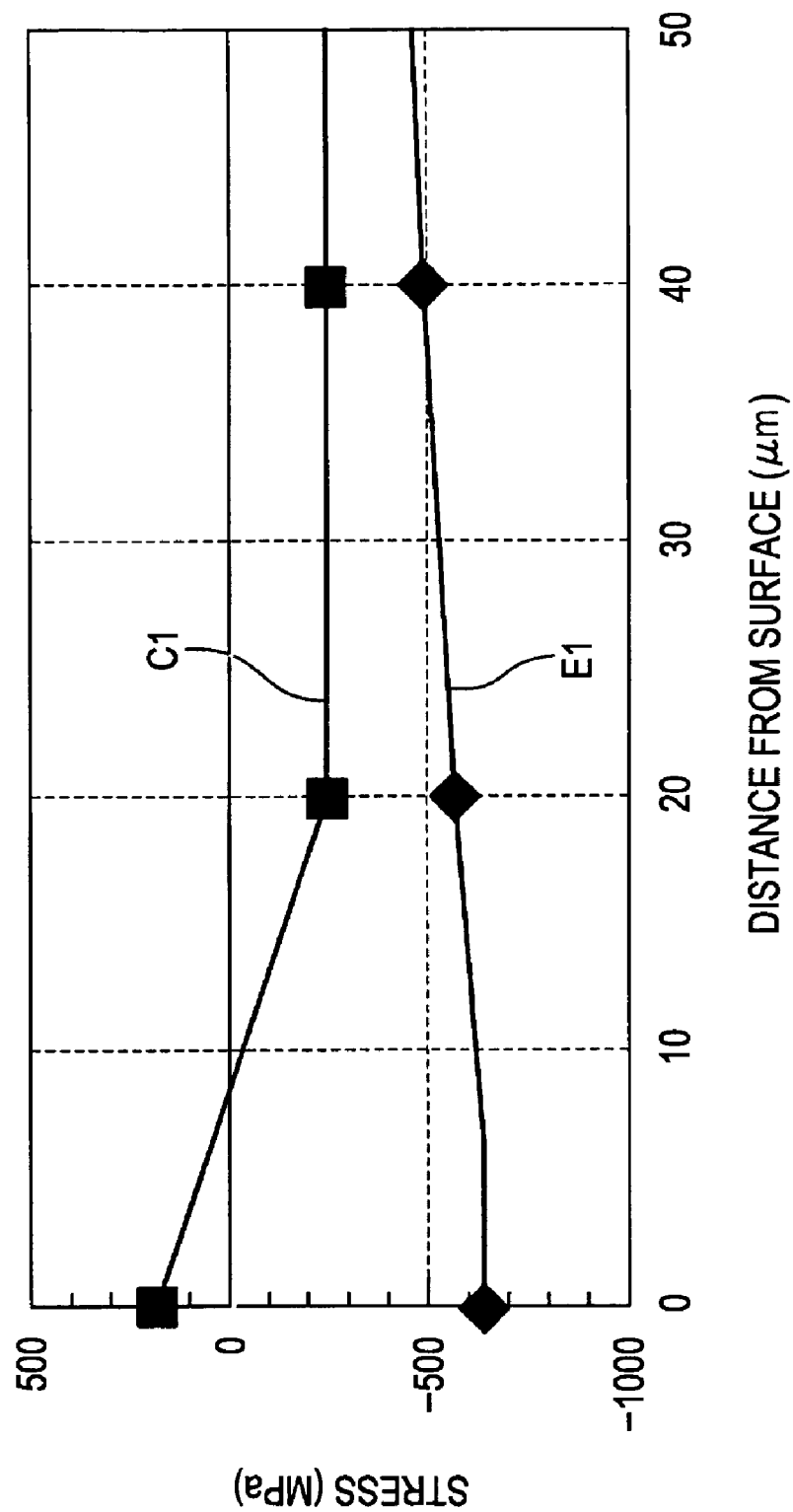
FIG. 6 is a graph showing exemplary results of the generation of residual stresses in Example 1.

Next, the residual stresses of the steel members after carburizing and hardening were measured and compared. FIG. 6 shows the measurement results. In the figure, the abscissa represents the distance from the surface of the bottom part 815, and the ordinate represents the residual stress wherein the tension is represented as plus and the compression is represented as minus.

According to the results, in the case of the exemplary implementation (E1), a compressive residual stress is applied on at least from the top surface. In contrast, in the case of the comparative method (C1), a tensile residual stress is applied on the top surface. When the residual stress on the top surface is a tensile stress, various problems may occur. Therefore, it is necessary to relieve the tensile residual stress by performing, for example, a heat treatment or a surface modification treatment. Accordingly, the method of an exemplary implementation is also advantageous in that a special treatment for improving the effect of such a residual stress need not be performed.

Example 2

In this example, several types of methods (Tests 1 to 3) are performed to examine the generation of distortions during cooling.

Figure 7:
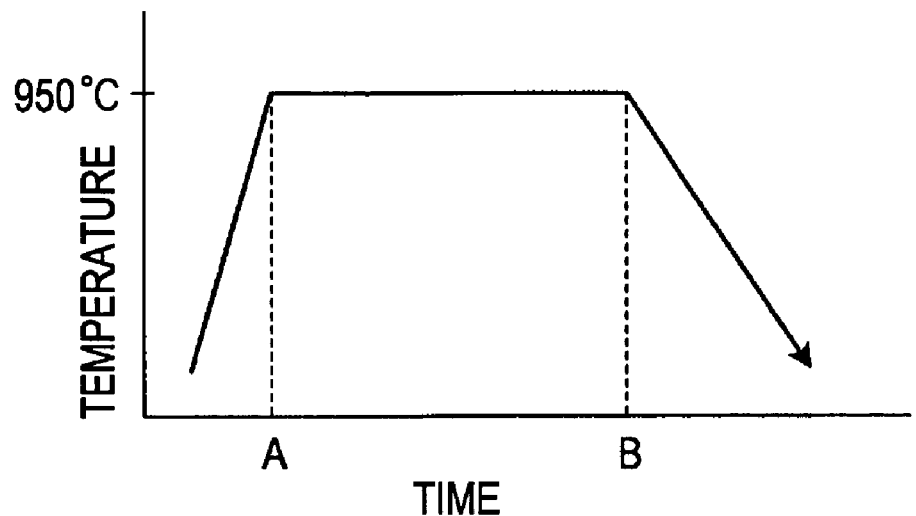
FIG. 7 is a graph showing an exemplary cooling pattern of a steel member of Test 1 in Example 2.

Test 1:

In Test 1, as shown in FIG. 7, carburizing was performed by heating the steel members to 950° C., which is the austenitizing temperature, or higher, and the steel members were then cooled to 150° C. or lower.

Figure 8:
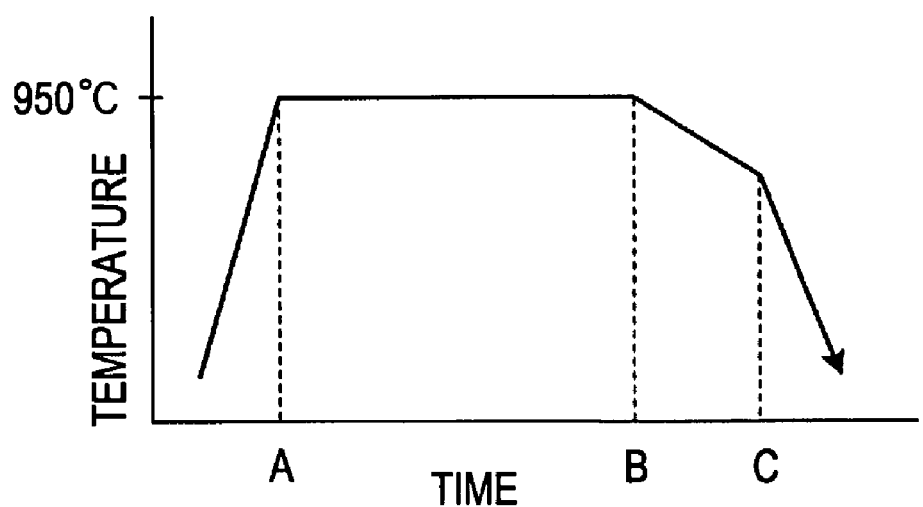
FIG. 8 is a graph showing an exemplary cooling pattern of a steel member of Test 2 in Example 2.
Figure 9:
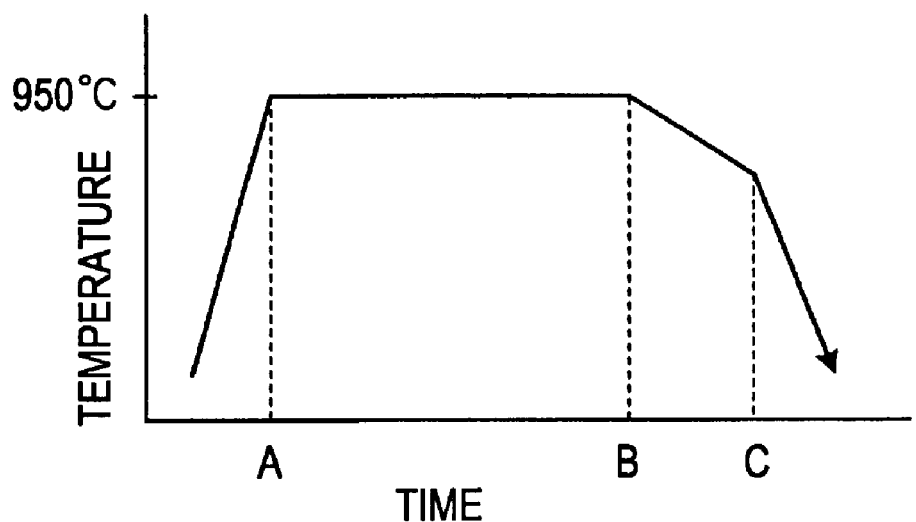
FIG. 9 is a graph showing an exemplary cooling pattern of a steel member of Test 3 in Example 2.
Figure 10:
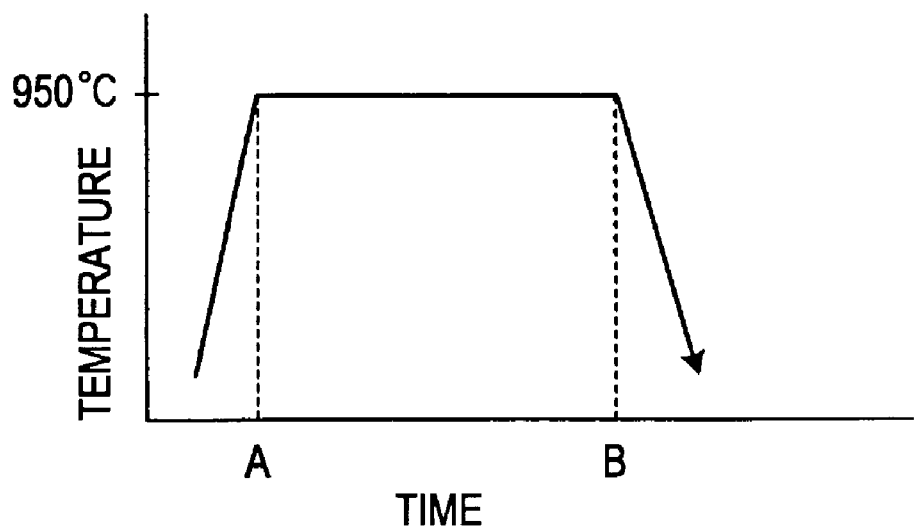
FIG. 10 is a graph showing an exemplary cooling pattern of a steel member of Test 4 in Example 2.

FIG. 7 shows the temperature history of the steel members wherein the abscissa represents the time and the ordinate represents the temperature (FIGS. 8 to 10 described below are the same). The period ranging from point A to point B in the figure is the period of the heat treatment, and the period from point B and thereafter is the cooling period. In Test 1, a reduced-pressure cooling was performed in which the steel members were cooled in a state in which the pressure of the cooling gas was reduced to lower than atmospheric pressure from the start to the completion of the cooling.

$N_2$ was used as the cooling gas, the pressure was reduced to be constantly maintained at 0.3 bar, and stirring of the cooling gas was performed. A stirring rate, of 550 rpm obtained by constantly operating a stirrer fan provided in the unit, was used for cooling.

Test 2:

In Test 2, as shown in FIG. 8, cooling was performed in which the steel members were cooled in a state in which the pressure of the cooling gas was reduced to lower than atmospheric pressure from the start to the completion of the cooling. However, the detailed conditions were different from those in Test 1. In test 2, $N_2$ was used as the cooling gas, and the pressure was reduced to be constantly maintained at 0.3 bar as in Test 1. However, the stirring rate was changed as follows: First, the cooling unit was operated while the number of revolutions of the stirrer fan was reduced to a constant speed of 250 rpm, and 15 minutes later (point C in FIG. 8), the number of revolutions was changed to a constant speed of 550 rpm. Other conditions were the same as those in Test 1.

Test 3:

In Test 3, as shown in FIG. 9, cooling was performed in which the steel members were cooled in a state in which the pressure of the cooling gas was reduced to lower than atmospheric pressure from the start to the completion of the cooling. However, the detailed conditions were different from those in Test 1. That is, $N_2$ was used as the cooling gas, and the pressure was reduced to be constantly maintained at 0.65 bar. In addition, stirring of the cooling gas was not performed in the initial stage, but 15 minutes later (point C in FIG. 9), the number of revolutions was changed to a constant speed of 550 rpm. Other conditions were the same as those in Test 1.

Test 4 (Comparative Test):

In Test 4, as shown in FIG. 10, cooling was performed in which the steel members were cooled in a state in which the pressure of the cooling gas was atmospheric pressure from the start to the completion of the cooling. That is, the pressure of the cooling gas was constantly maintained at 1.0 bar (atmospheric pressure). The number of revolutions of the stirrer fan was reduced to a constant speed of 250 rpm, which was lower than the rated speed. The conditions for the heat treatment before cooling were the same as those in Test 1.

A plurality of ring gears, i.e., the steel members 8, were processed by the above cooling methods of Tests 1 to 4. The dimensions were measured to compare the amount of distortions.

Figure 11:
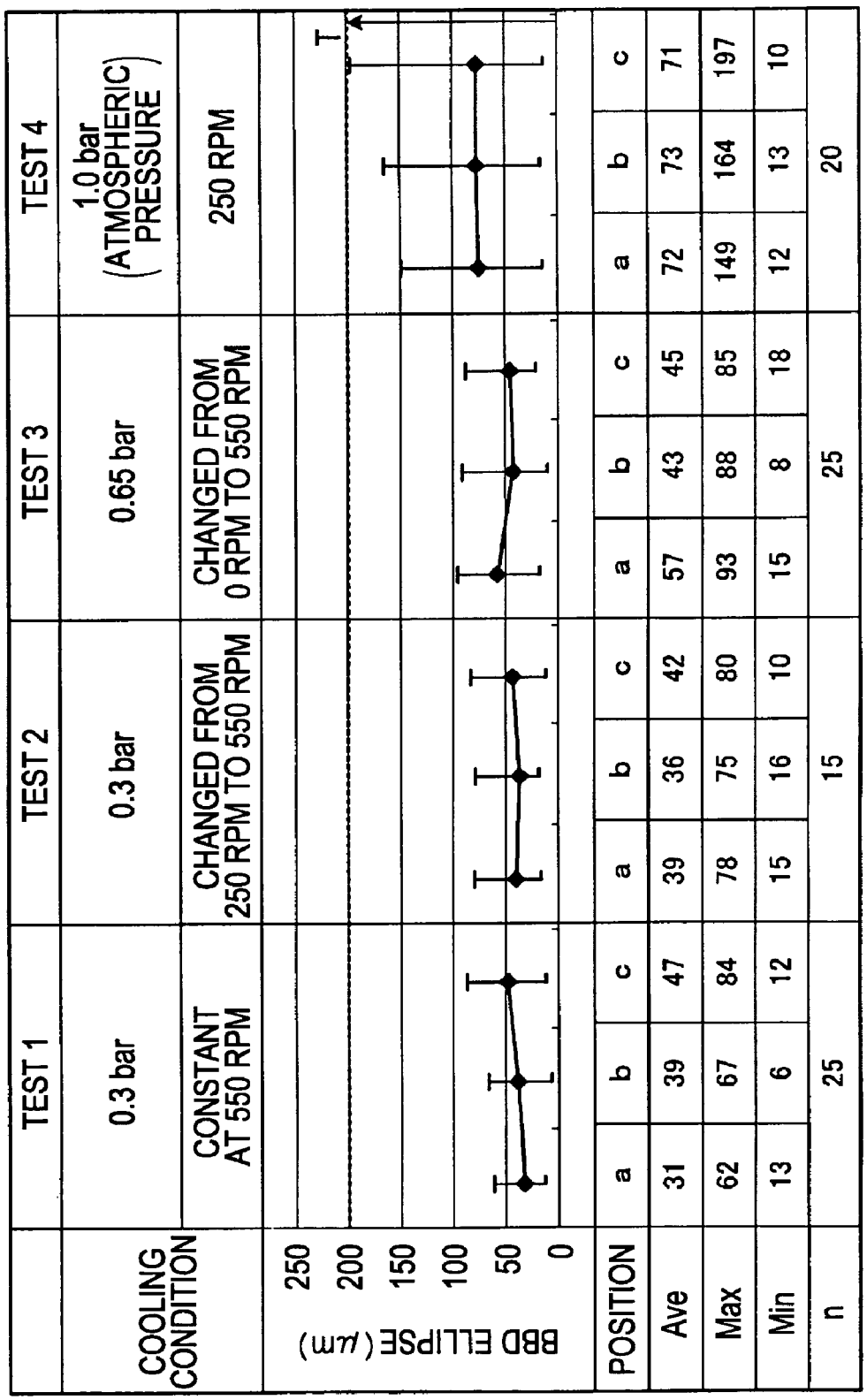
FIG. 11 illustrates graphs showing exemplary results of the generation of distortions in Example 2.

As shown in FIGS. 3A and 3B, the ring gear 8 processed in this example includes a tooth flank 81 provided in the inner peripheral surface of a ring-shaped main body 80. In the ring gear 8, the circularity is very important. Accordingly, the BBD dimension was measured over the circumference at three positions (position a, position b, and position c in FIG. 3(b)) disposed in the axial direction. The difference between the maximum and the minimum of the BBD dimension in each measurement position was calculated as "BBD ellipse (μm)." The BBD dimension is measured as follows: As shown in FIG. 3, steel balls 88 having a predetermined diameter are disposed so as to be in contact with recesses of the tooth flank 81, and the inner diameter between the facing steel balls 88 is measured. This measurement of the BBD ellipse was performed for all the processed steel members. The average (Ave), the maximum (Max), and the minimum (Min) of the measured BBD ellipse were calculated, and the numerical values and graphs thereof are shown in FIG. 11. The number (n) of steel members processed in each test was in the range of 10 to 25.

As is apparent from FIG. 11, the value of the BBD ellipse in all Tests 1 to 3 was smaller than that in Test 4 (Comparative Test). These results show that the effect of suppressing distortions is very high in Tests 1 to 3.

Example 3

In this example, as shown in FIGS. 12A and 12B, the distortion was evaluated as in Example 1 using a ring-shaped steel member 7 (differential ring gear) having a tooth flank 71 provided in the outer peripheral surface of a ring-shaped main body 70. This steel member 7 is also used as a part of the automatic transmission of automobiles.

An exemplary implementation and a comparative method that were performed in this example were the same as those in Example 1. Regarding the blank material, Sample E1 in Example 1 and Sample E3 in Example 4 described below were used in the method of an exemplary implementation. Sample C1 in Example 1 was used in the comparative method.

To evaluate the distortion, an "OBD" at three positions (position a, position b, and position c) in the axial direction of the steel member 7 was measured. The "OBD" is a dimension measured as follows: Steel balls having a predetermined diameter are disposed at each position in the axial direction so as to be in contact with recesses of the tooth flank 71, and the outer diameter between the facing steel balls is measured. This measurement was performed at four positions in the circumferential direction, and the average was used as an evaluation value. The average (Ave), the maximum (Max), and the minimum (Min) of the measured OBD dimensions were calculated, and the numerical values and graphs thereof are shown in FIGS. 13 and 14.

Figure 13:
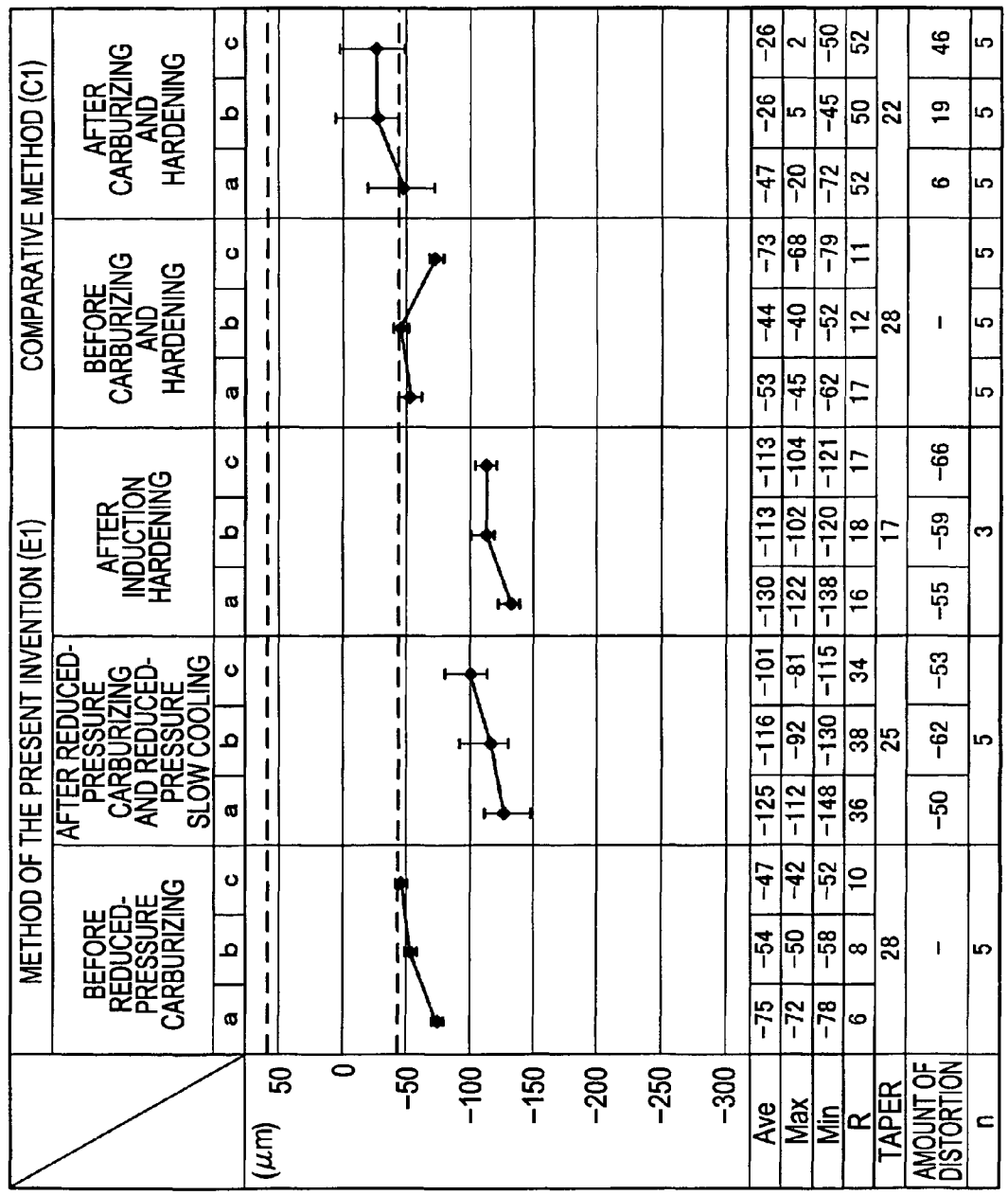
FIG. 13 illustrates graphs showing exemplary results of the generation of distortions of Samples E1 and C1 in Example 3.

FIG. 13 shows the results in which the method of an exemplary implementation was applied to Sample E1, and the results in which the comparative method was applied to Sample C1. FIG. 14 shows the results in which the method of an exemplary implementation was applied to Sample E3, and also shows the results in which the comparative method was applied to Sample C1 as in FIG. 13.

In the method of an exemplary implementation, the evaluation was performed at three times, namely, before carburization, after carburization and cooling, and after induction hardening. In the comparative method, the evaluation was performed at two times, namely, before carburization and hardening, and after carburization and hardening. Additionally, during hardening in the exemplary implementation, the cooling rate during quenching was 1,420° C./sec.

Figure 14:
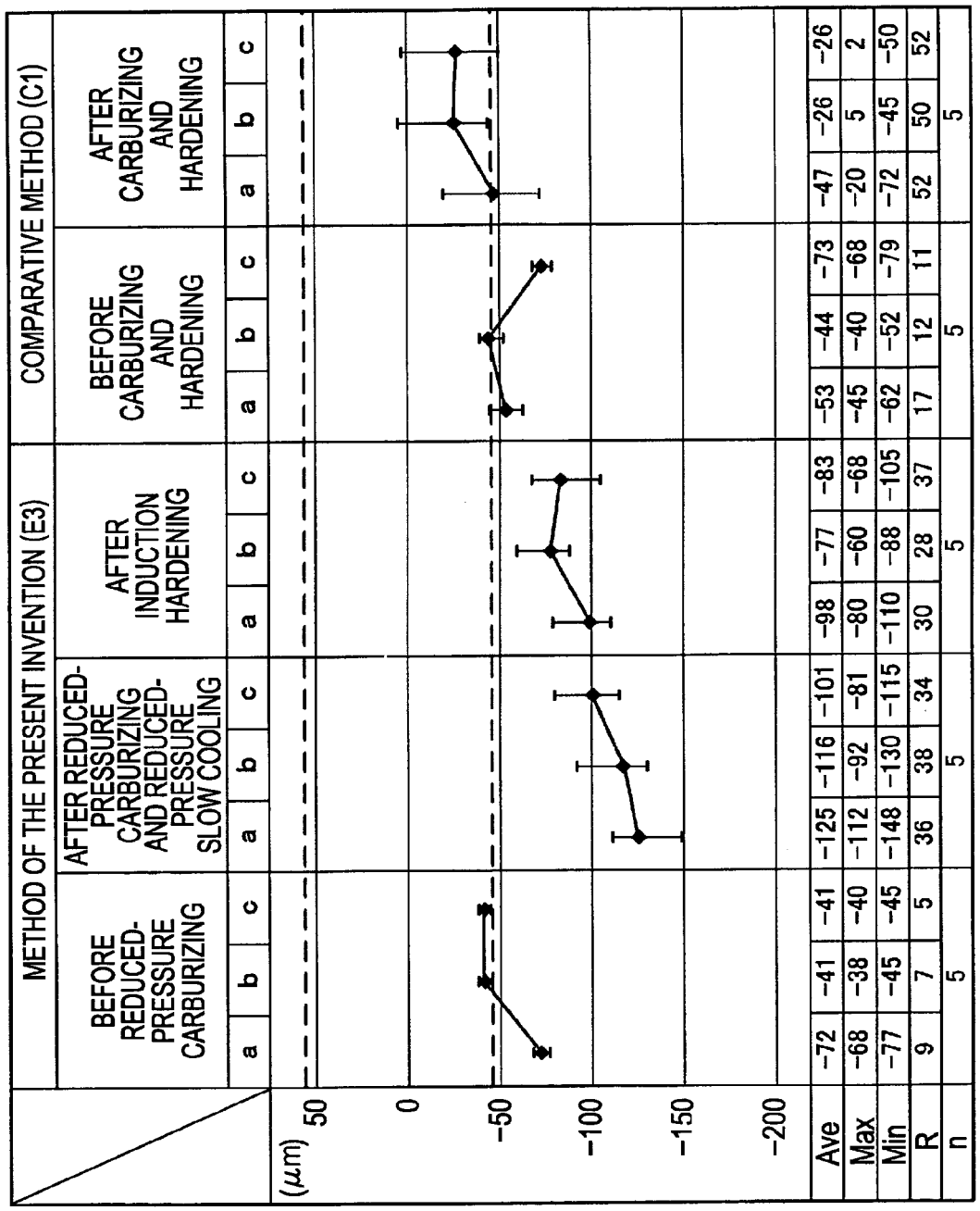
FIG. 14 illustrates graphs showing exemplary results of the generation of distortions of Samples E3 and C1 in Example 3.

As is apparent from FIGS. 13 and 14, exemplary implementations can suppress the generation of distortions even after hardening.

In contrast, in the case of the comparative method, large distortions were generated by carburization and hardening.

Example 4

In this example, the exemplary implementation was performed using gears (FIGS. 3A and 3B) made of different types of blank (Samples E2 to E4), containing different chemical components than the blank (Sample E1) in Example 1.

Sample E2 is a non-heat-treated steel containing, as chemical components: 0.11% to 0.15% of C, 0.15% to 0.35% of Si, 2.10% to 2.30% of Mn, 0.90% to 1.10% of Cr, 0% to 0.3% of Mo, 0% to 0.3% of V, and 0% to 0.05% of S in terms of mass percent, the balance being Fe and inevitable impurities. More specifically, Sample E2 is a non-heat-treated steel containing 0.13% of C, 0.24% of Si, 2.20% of Mn, 1.00% of Cr, 0.18% of Mo, 0.07% of V, and 0.018% of S in terms of mass percent, the balance being Fe and inevitable impurities.

Sample E3 is a developed steel containing, as a chemical composition: 0.2% to 0.3% of C, 0.4% to 0.6% of Si, 1.4% to 2.0% of Mn, 0.4% to 0.6% of Cr, 0% to 0.1% of Mo, 0.05% to 0.25% of V, and 0% to 0.5% of S in terms of mass percent, the balance being Fe and inevitable impurities. More specifically, Sample E3 is a developed steel containing 24% of C, 0.5% of Si, 1.8% of Mn, 0.5% of Cr, 0.03% of Mo, 0.12% of V, and 0.016% of S in terms of mass percent, the balance being Fe and inevitable impurities.

Sample E4 is a developed steel containing, as chemical components: 0.2% to 0.3% of C, 0.4% to 0.6% of Si, 1.4% to 2.0% of Mn, 0.4% to 0.6% of Cr, 0.3% to 0.4% of Mo, 0.05% to 0.25% of V, and 0% to 0.5% of S in terms of mass percent, the balance being Fe and inevitable impurities. More specifically, Sample E4 is a developed steel containing 0.24% of C, 0.5% of Si, 1.4% of Mn, 0.5% of Cr, 0.37% of Mo, 0.12% of V, and 0.016% of S in terms of mass percent, the balance being Fe, and inevitable impurities.

The Vickers hardness (Hv) of the gears (steel members) obtained after carburization and hardening was measured, as in Example 1, to determine the relationship between the hardness and the distance from the surface of the bottom part 815 of the gears.

Figure 15:
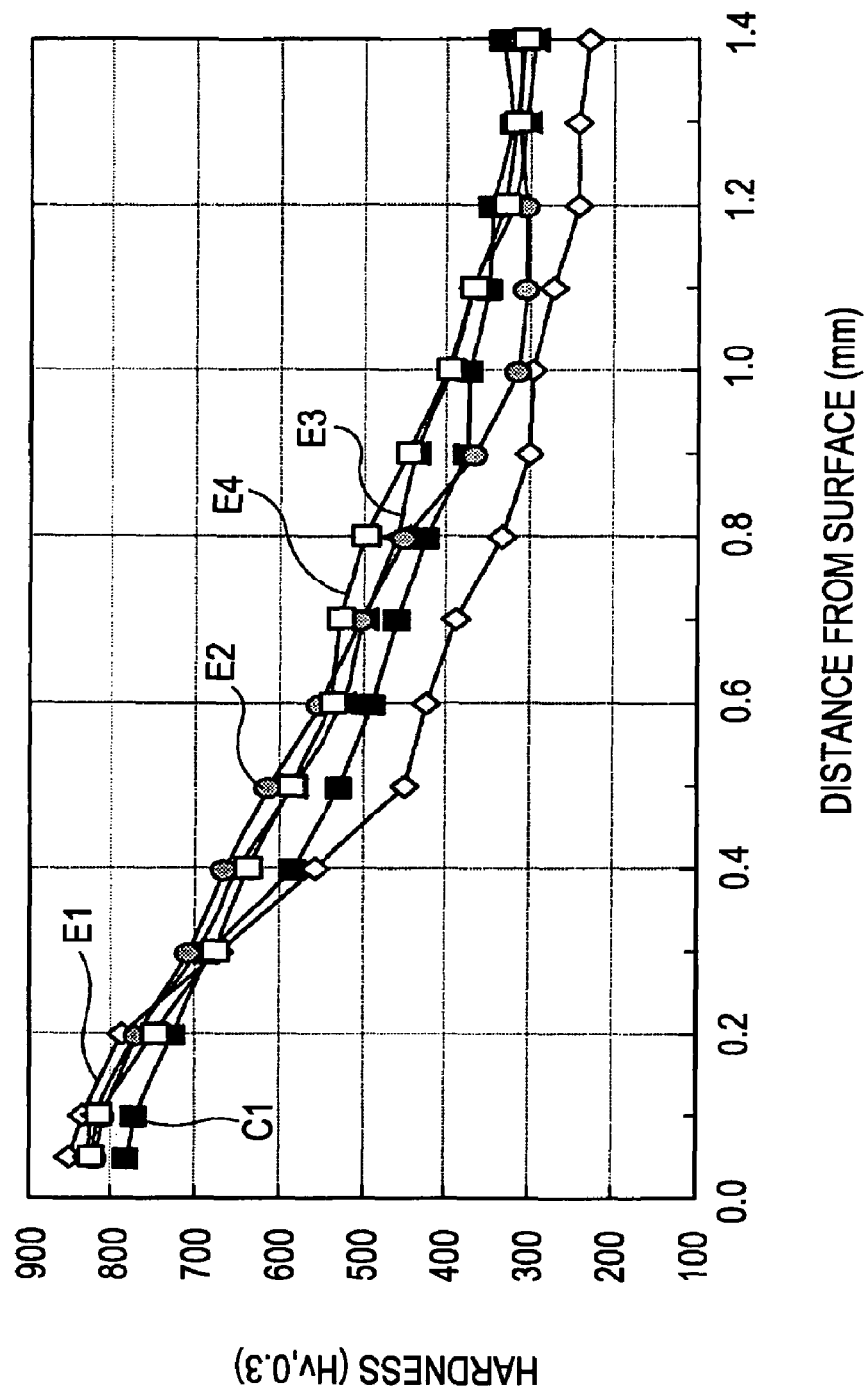
FIG. 15 is a graph showing exemplary hardness distributions after carburizing and hardening in Example 4.

FIG. 15 shows the measurement results. In the figure, the abscissa represents the distance (mm) from the surface, and the ordinate represents the Vickers hardness (Hv). The results of the gear made of Sample E2 are denoted by E2, and the results of the gear made of Sample E3 are denoted by E3, and the results of Sample E4 are denoted by E4. For reference, the results of Sample E1, which is an example of an exemplary implementation, and the results of Sample C1, which is a comparative example in Example 1 are also shown in the figure.

As is apparent from the figure, even when the material is changed to Samples E2, E3, and E4, by using an exemplary implementation, an excellent heat-treatment that is the same as or superior to the known method can be performed.

Example 5

In this example, as shown in FIG. 16, a reduced-pressure slow-cooling pattern that can be used as the cooling step a2 described in Example 1 will be described.

In FIG. 16, the abscissa represents the time, a first ordinate represents the number of revolutions (a) of a cooling fan, a second ordinate represents the temperature (b) of a workpiece, and a third ordinate represents the pressure (c) of a cooling gas.

As shown in the figure, in this example, during a first cooling step P31, a reduced-pressure slow cooling was performed while the number of revolutions of the cooling fan was set to a low value, and the pressure of the cooling gas was reduced to a value that was sufficiently lower than atmospheric pressure.

Next, during a second cooling step P32, the number of revolutions of the cooling fan was set to a value somewhat higher than that during the first cooling step P31, though the value was sufficiently lower than the rated speed. Furthermore, the pressure of the cooling gas was also set to a value higher than that during the first cooling step P31, though the value was lower than atmospheric pressure. Thus, the cooling capacity was somewhat higher than that during the first cooling step P31. In this example, the temperature of the workpiece reached the $A_1$ transformation point during the second cooling step P32.

Next, during a third cooling step P33, rapid-cooling was performed in which the number of revolutions of the cooling fan and the pressure of the cooling gas were sufficiently increased.

As described above, in the first cooling step P31 in which the temperature of the workpiece is the highest, the pressure of the cooling gas and the circulation velocity (number of revolutions) of the cooling fan are decreased, thus, distortions due to cooling can be reliably suppressed. Next, in the second cooling step P32, the possibility of the generation of distortions due to cooling is further decreased. Accordingly, although the cooling capacity is increased, slow cooling is maintained so as to prevent distortions caused by the structural transformation that occurs when the temperature passes through the $A_1$ transformation point of the steel. Therefore, distortions that are generated when the temperature passes through the $A_1$ transformation point can be minimized. Thereafter, in the third cooling step P33, the cooling capacity can be maximized by increasing the pressure of the cooling gas and the circulation velocity.

Example 6

In this example, a heat-treatment method of a disc-shaped steel member such as a lock-up clutch piston for a torque converter will be described with reference to FIGS. 17 to 28.

The heat treatment of the steel member in this example has substantially the same profile as that shown in FIG. 1A, however, the heating temperature in the hardening step is different. Specifically, in this example, the steel member is heated to 950° C., which is the carburizing temperature, and the temperature is then maintained at 950° C. for 49 minutes to perform carburization. The temperature is then decreased to 150° C. or lower over a period of 40 minutes under a reduced pressure. These steps are the same as those in Example 1. Subsequently, electron-beam hardening is performed as follows. An electron beam is irradiated onto a desired part of the steel member so that only the surface layer is heated to the melting point, or a higher temperature, thereby forming a molten part. The molten part is then quenched to the martensitic transformation range to form a martensitic structure, thereby forming a hardened layer.

First, the above hardening step using an electron beam will be described.

Figure 17A:
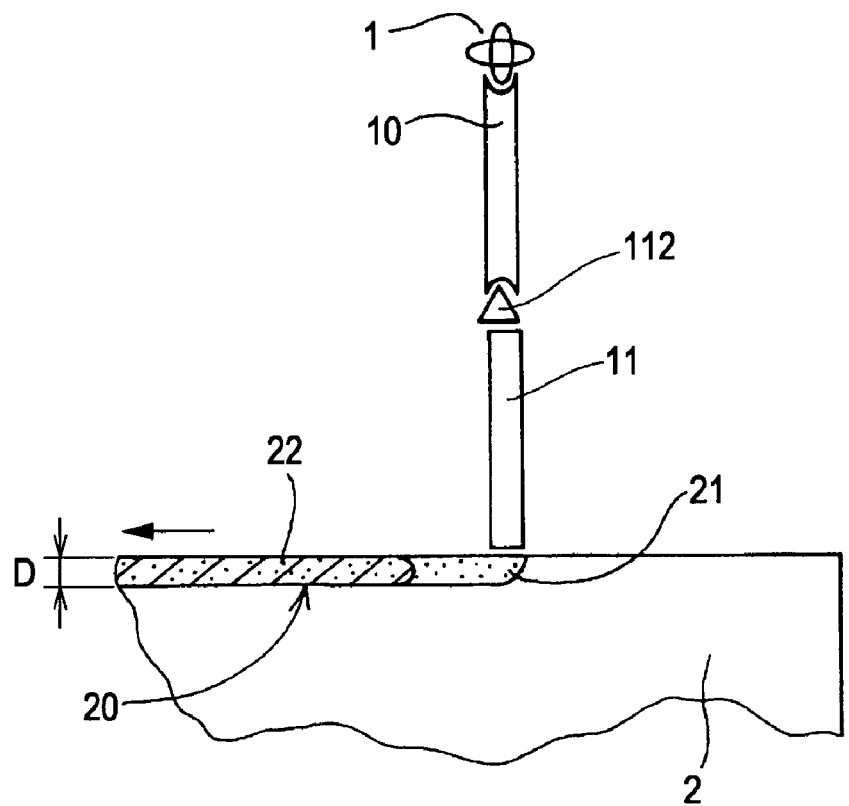
FIG. 17A is a side view showing an exemplary irradiation state of a high-density energy beam in Example 6.
Figure 17B:
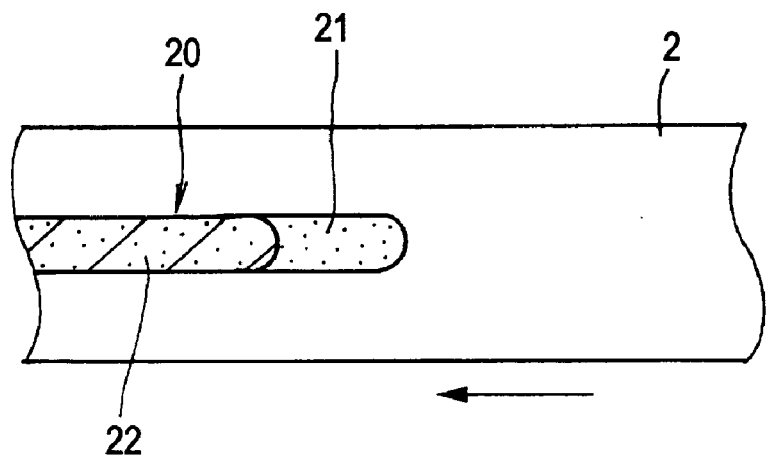
FIG. 17B is a plan view showing the state.

As shown in FIGS. 17A and 17B, the surface layer of a steel member 2 is heated at an extremely high rate of 7,500° C./sec or more to form a molten part 21. Accordingly, the molten part 21, which is in a molten state at the melting point Mp or a higher temperature, is formed at once. In this case, the time required from the start of the high-density energy beam irradiation to the formation of the molten part 21 is very short, i.e., 0.2 seconds. The depth of the molten part is adjusted to ¼ of the thickness of the steel member 2 or less. The adjustment is performed by controlling the output of the high-density energy beam and the irradiation pattern.

Subsequently, the molten part 21 is cooled at an extremely high cooling rate of 600° C./sec or more immediately after the formation of the molten part 21 without maintaining the high-temperature state. In this example, the specific cooling rate was 1,600° C./sec.

Accordingly, the molten part 21 is immediately solidified and temporarily becomes a homogeneous austenitic structure. Subsequently, when the cooling further proceeds, the molten part is cooled to the martensitic range to form a martensitic structure 22.

As shown in FIG. 17A, hardening is performed by partly irradiating a high-density energy beam (electron beam) 11 onto a surface treatment area 20 of the steel member 2. That is, a high-density energy beam 10 is emitted from a high-density energy beam generation source, converted to the high-density energy beam 11 having an optimum irradiation pattern using a deflector lens 112. The high-density energy beam 11 is then irradiated onto the steel member 2.

To facilitate irradiation, the steel member 2 is moved in the direction shown by the arrow in the figures at a constant speed. The surface treatment area 20 is rapidly heated by the irradiation of the high-density energy beam 11 to form the molten part 21. When the irradiation of the high-density energy beam 11 is completed by the movement of the steel member 2, the molten part 21 is quenched by self-cooling.

Accordingly, a surface layer part made of the martensitic structure 22 with high hardness is continuously formed on the steel member 2.

As described above, according to this example, only the surface layer of the steel member 2 is rapidly heated to form a molten state, which is then immediately quenched. Consequently, the conduction of heat to areas other than the surface treatment area 20 of the steel member 2 is minimized, thus generation of distortions caused by heat can also be minimized and the effect of self-cooling can be reliably obtained.

In particular, in this example, since the molten part 21 is formed on only the surface layer whose depth is ¼ of the thickness of the steel member 2 or less, self-cooling can be performed at a cooling rate of 600° C./sec or more. This cooling rate sufficiently exceeds the critical cooling rate of the martensitic transformation. Accordingly, the above cooling rate can reliably prevent defects caused during hardening.

In addition, the processing time can be markedly reduced as compared with known methods, thereby increasing production efficiency.

Furthermore, since carburization is performed prior to the above-described electron-beam hardening step, a hardened layer having a very high hardness can be produced.

A specific apparatus used for the above heating by an electron beam and the like will now be briefly described.

Figure 19:
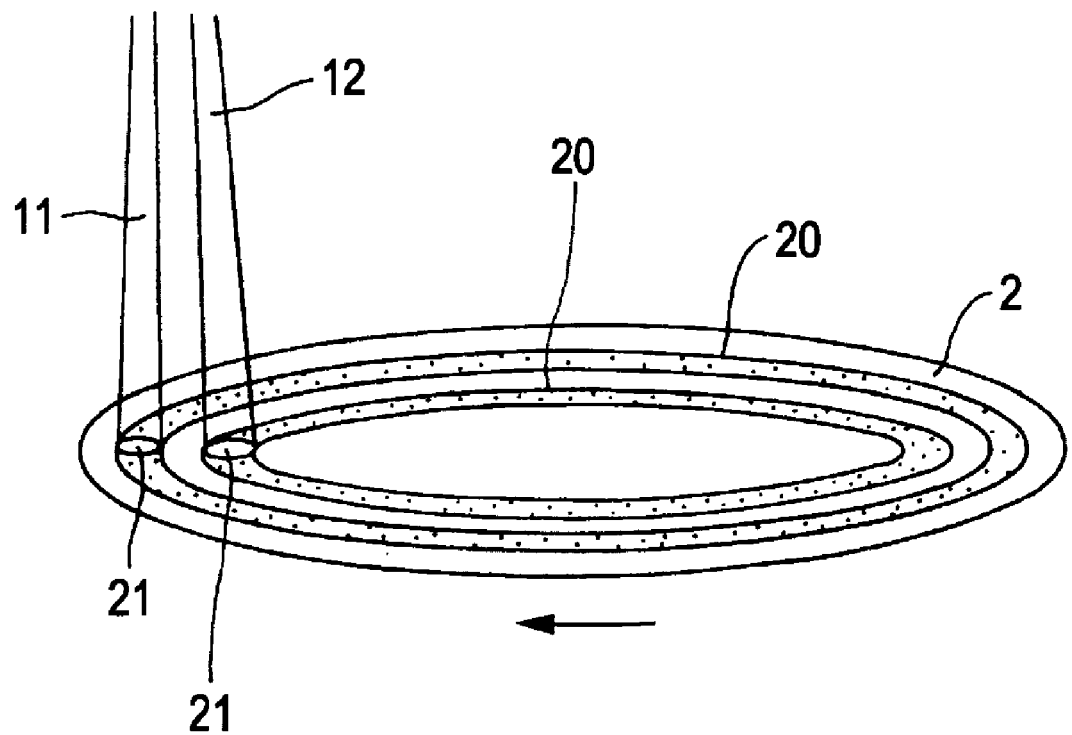
FIG. 19 is a schematic view showing an exemplary irradiation state of a high-density energy beam in Example 6.

As shown in FIGS. 18 and 19, the heating by an electron beam can be performed by continuously irradiating high-density energy beams 11 and 12 onto, for example, two ring-shaped surface treatment areas 20 (FIGS. 17A, 17B and 19) of the steel member 2, while the steel member 2 is rotated.

The steel member 2 has a saucer shape (disc shape) just like a lock-up clutch piston, which is a part for a torque converter. Accordingly, the ring-shaped surface treatment areas 20 can be processed on the two areas by a single operation.

As shown in FIG. 18, the heat-treatment apparatus includes a processing chamber 19 in which the steel member 2 is placed, a beam generation source 1 for irradiating high-density energy beams 11 and 12 into the processing chamber 19, and a focusing lens 111 and a deflector lens 112 that control, for example, an irradiation pattern of a high-density energy beam 10 emitted from the beam generation source 1.

The heat-treatment apparatus also includes an evacuation unit 16 for reducing the pressure in the processing chamber 19 and a high-speed deflection control unit 10 for controlling the focusing lens 111 and the deflector lens 112. By controlling the focusing lens 111 and the deflector lens 112, the distribution of the high-density energy beams 11 and 12 irradiated onto the steel member 2, the output, and the irradiation pattern thereof are adjusted.

These units are controlled by a total control unit 17. A rotary motor 150 for rotating a loading table 15 for the steel member 2 is provided under the processing chamber 19.

In performing the electron-beam hardening with the heat-treatment apparatus, first, the rotary motor 150 is driven to rotate the steel member 2 in the direction shown by the arrow in FIG. 19. In addition, the pressure is reduced with the evacuation unit 16 so that the inside of the processing chamber 19 is in a vacuum state.

Subsequently, as shown in FIGS. 18 and 19, the two high-density energy beams 11 and 12 are irradiated onto the steel member 2 at the same time. These high-density energy beams 11 and 12 are relatively moved on the steel member 2 at a constant rate by the rotation of the steel member 2.

Accordingly, as shown in FIG. 19, areas that have been irradiated with the high-density energy beam 11 and 12 become the molten parts 21, and immediately thereafter, are transformed to a martensitic structure. Consequently, the two ring-shaped surface treatment areas 20 become a hardened layer. As described above, this hardened layer has a very high hardness because of an additional effect of the carburization performed in advance.

Next, an example in which the above-described hardening step using an electron beam is applied to a lock-up clutch piston 41 will be described more specifically.

Figure 20:
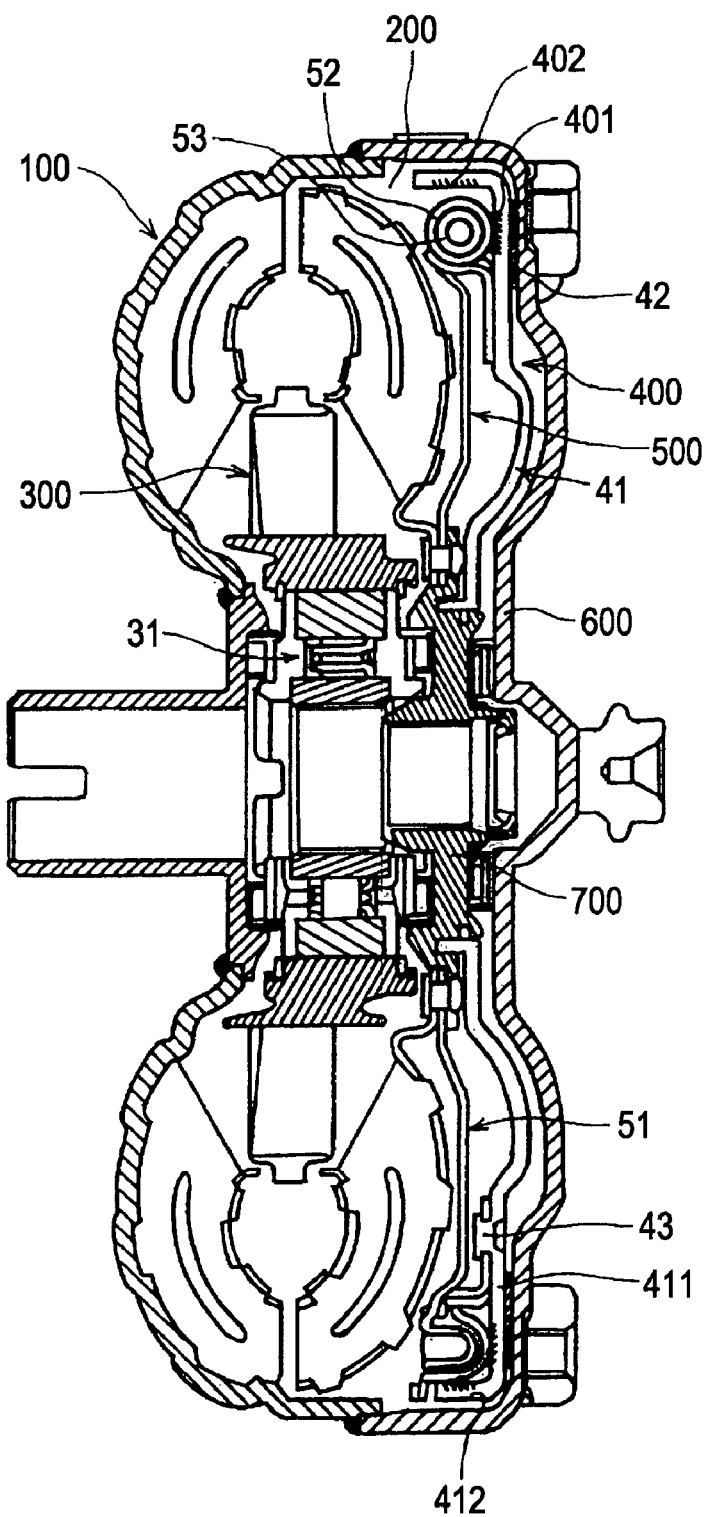
FIG. 20 is a longitudinal cross-sectional view of an exemplary lock-up clutch piston in Example 6.
Figure 21:
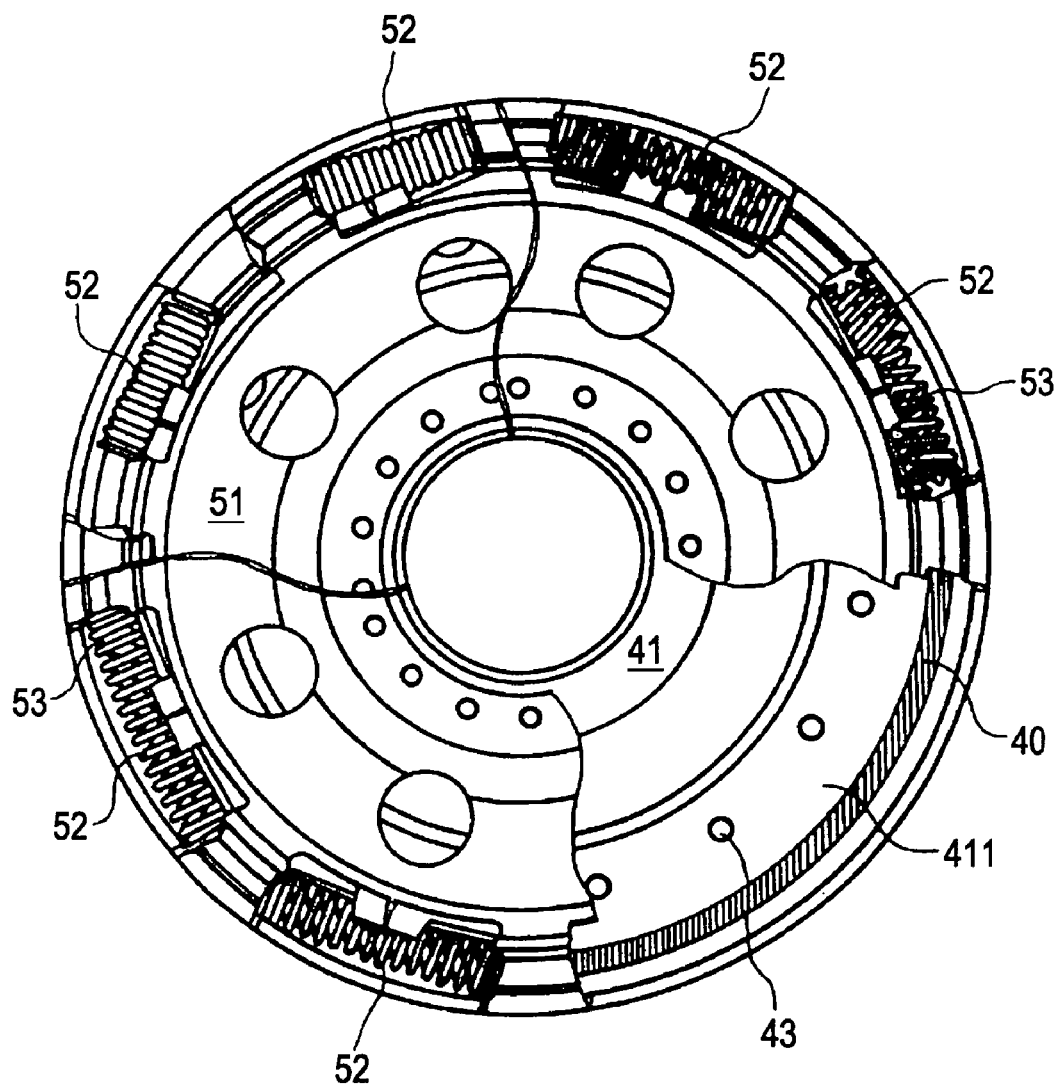
FIG. 21 is a plan view of the exemplary lock-up clutch piston in Example 6.

A torque converter, which constitutes a power transmission system of automobiles etc., as shown in FIGS. 20 and 21. A torque converter includes a torus, which is comprised of a pump impeller 100, a turbine runner 200, a stator 300, a lock-up clutch unit 400, and a damper unit 500.

In the torque converter, the rotation of an engine transmitted through a crank shaft (not shown) is transmitted to a front cover 600 and further transmitted to the pump impeller 100 fixed thereto. When the pump impeller 100 rotates, oil in the torus is rotated in the periphery of a shaft and circulated between the pump impeller 100, the turbine runner 200, and the stator 300 while centrifugal force is applied.

By an operation of, for example, the stator 300 (in which a one-way clutch 31 for enabling one-way rotation is provided at the side of the inner periphery) disposed between the pump impeller 100 and the turbine runner 200, when the difference in rotational speed between the pump impeller 100 and the turbine runner 200 is large immediately after the pump impeller 100 starts rotating, e.g., when a vehicle starts moving, the torque converter operates as a torque converter to amplify the torque. On the other hand, when the rotational speed of the turbine runner 200 is increased and the difference in rotational speed between the pump impeller 100 and the turbine runner 200 becomes small, the torque converter operates as a simple fluid coupling.

As described above, the torque converter includes the lock-up clutch unit 400. This lock-up clutch unit 400 is provided for improving fuel consumption and the like. Specifically, when the vehicle starts moving and reaches a predetermined vehicle speed, the lock-up clutch piston 41 of the lock-up clutch unit 400 is activated by a switching of oil supply by a lock-up relay valve (now shown) and moved in the axial direction to engage with the front cover 600 via an abrasion member 42. Accordingly, since the rotation of the engine is transmitted to an input axis of the speed change mechanism without passing through the torque converter, the fuel consumption can be improved.

The damper unit 500 installed in the torque converter absorbs fluctuations in transmission torque generated when the lock-up clutch piston 41 is engaged with or detached from the front cover 600. The damper unit 500 is fixed to the lock-up clutch piston 41 by a dowel caulking 43 and composed of, for example, a driven plate 51 that is rotated together with the turbine runner 200 and springs 52 and 53.

The springs 52 are provided for a first stage and are disposed at eight positions in the circumferential direction of the lock-up clutch piston 41, and the springs 53 are provided for a second stage and are disposed at four positions in the circumferential direction of the lock-up clutch piston 41. Each of the springs 53 is disposed coaxially within every second one of the springs 52. The diameter of the spring 53 is smaller than that of the spring 52, and the length of the spring 53 is also shorter than that of the spring 52. After the torsion angle of the spring 52 reaches a predetermined value and the transmission torque reaches an inflection point torque, the spring 53 starts bending.

Accordingly, the rotation transmitted from the front cover 600 via the abrasion member 42 is transmitted to a turbine hub 700 via the damper unit 500. In this case, fluctuations in the transmission torque during the transmission of the rotation are absorbed by the contraction of the springs 52 and 53. The springs 52 and 53 also have a function of preventing vibrations, undesired sounds, and the like that are generated when rapid fluctuations in the output torque of the engine are transmitted to a speed changer (not shown).

In the above-described torque converter, during the normal driving of the lock-up clutch piston 41 (when the lock-up clutch piston 41 is rotated in the counterclockwise direction in FIG. 21 while the lock-up clutch unit 400 is in an engaged state), and during the inverse driving (when the lock-up clutch piston 41 is rotated in the clockwise direction in FIG. 21 during engine-braking etc.), the springs 52 are compressed. Accordingly, the springs 52 are repeatedly slid over a flat plate part 411 of the lock-up clutch piston 41. Consequently, at the flat plate part 411 of the lock-up clutch piston 41, abrasion occurs due to the sliding over the springs 52.

In addition, during the rotation of the lock-up clutch piston 41, the springs 52 are subjected to centrifugal force, and are pressed onto a projecting part 412 of the lock-up clutch piston 41. Accordingly, during the normal driving and the inverse driving of the lock-up clutch piston 41, the projecting part 412 of the lock-up clutch piston 41 is also slid over the springs 52 repeatedly, resulting in abrasion.

In this example, electron-beam hardening is performed for the flat plate part 411 and the projecting part 412 of the lock-up clutch piston 41, which is in the above-described operating environment.

Figure 22:
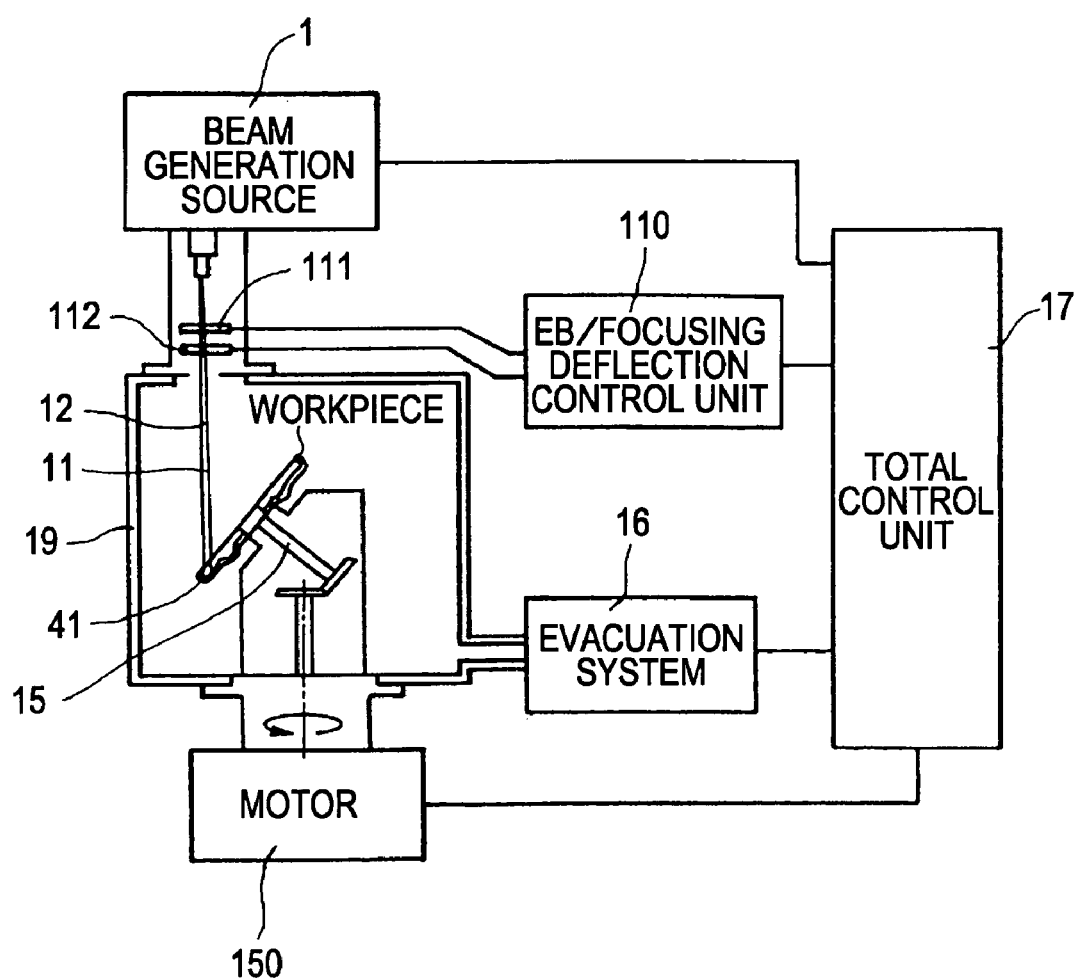
FIG. 22 is a schematic diagram of an exemplary heat-treatment apparatus for the lock-up clutch piston in Example 6.

FIG. 22 shows an apparatus used in electron-beam hardening of the lock-up clutch piston 41. As shown in the figure, the basic structure of the apparatus in this example is similar to that of the apparatus shown in FIG. 18, and a loading table 15 is disposed so as to be at angle of 45° with respect to the horizontal plane. A high-density energy beam 10 emitted from a beam generation source 1 is distributed to two high-density energy beams 11 and 12 to be irradiated. Other structures are the same as those of the apparatus shown in FIG. 18.

Figure 23:
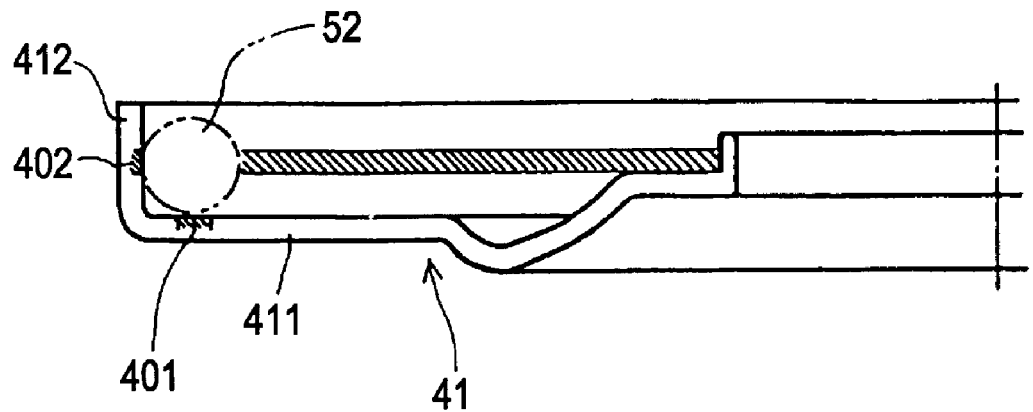
FIG. 23 is a view showing an exemplary surface treatment area of the lock-up clutch piston in Example 6.
Figure 24:
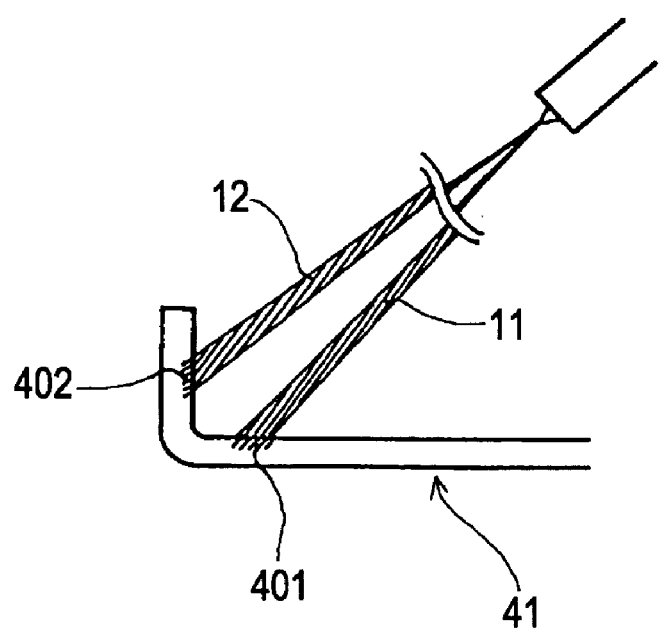
FIG. 24 is a schematic view showing an exemplary irradiation state of a high-density energy beam in Example 6.

As shown in FIGS. 23 and 24, a surface treatment is simultaneously performed on two surface treatment areas 401 and 402 of the flat plate part 411 and the projecting part 412, respectively, of the lock-up clutch piston 41 using this apparatus. Accordingly, a hardened layer having a thickness in the range of 0.1 to 0.2 mm is formed on each of the flat plate part 411 and the projecting part 412 having a thickness of 3 mm.

More specifically, the lock-up clutch piston 41 placed on the loading table 15 of the apparatus shown in FIG. 22 is rotated so that the moving rate of the surface treatment areas 401 and 402 is about 16.7 m/min. As shown in FIGS. 22 and 24, an electron beam with an output of 4.6 KW is used as the two high-density energy beams 11 and 12, and the surface treatment areas 401 and 402 are then irradiated with the beams.

Accordingly, in the two surface treatment areas 401 and 402, only the surface layer is melted within an extremely short time to form a molten part, and the molten part is then quenched within an extremely short time to become a martensitic structure. That is, the room-temperature structure (pearlite) is rapidly heated by electron beam irradiation to form a molten part which is then solidified by subsequent self-cooling to form austenite. Immediately thereafter, the austenite is further quenched by self-cooling and transformed into a martensitic structure.

The surface treatment area (hardened layer) 401 of the lock-up clutch piston 41 thus obtained is composed of a completely molten layer 211 that is disposed on the top surface and that has a thickness of about 0.03 mm and an incompletely molten layer 212 that is disposed under the completely molten layer 211 and that has a thickness of about 0.17 mm (not shown in the figure).

The lock-up clutch piston 41 produced in this example includes the surface treatment areas (hardened layers) 401 and 402 having excellent abrasion resistance at the sliding parts of its flat plate part 411 and its projecting part 412, respectively. Accordingly, when this lock-up clutch piston 41 is installed in the torque converter, excellent durability can be exhibited.

Furthermore, since areas other than the surface treatment areas (hardened layers) 401 and 402 have the pearlite structure, which is the same structure as that before the surface treatment, various types of plastic workings, e.g. plastic caulking, can be performed in the other areas.

In addition, the thickness of the surface hardened layer is very small, thus, areas other than the surface treatment areas are negligibly affected by the high-density energy beams 11 and 12. Accordingly, the shape of the outer diameter of the lock-up clutch piston 41 is maintained with high accuracy. Therefore, the lock-up clutch piston 41 of this example can be installed in the torque converter without performing a special process for removing distortions, thus reducing the production cost.

Furthermore, in this example, the two surface treatment areas 401 and 402 can be processed at the same time. Therefore, productivity higher than that of known methods can be achieved. As described above, since each of the two surface treatment areas 401 and 402 is processed within an extremely short time, the heat generated at either area does not affect the other.

Figure 25:
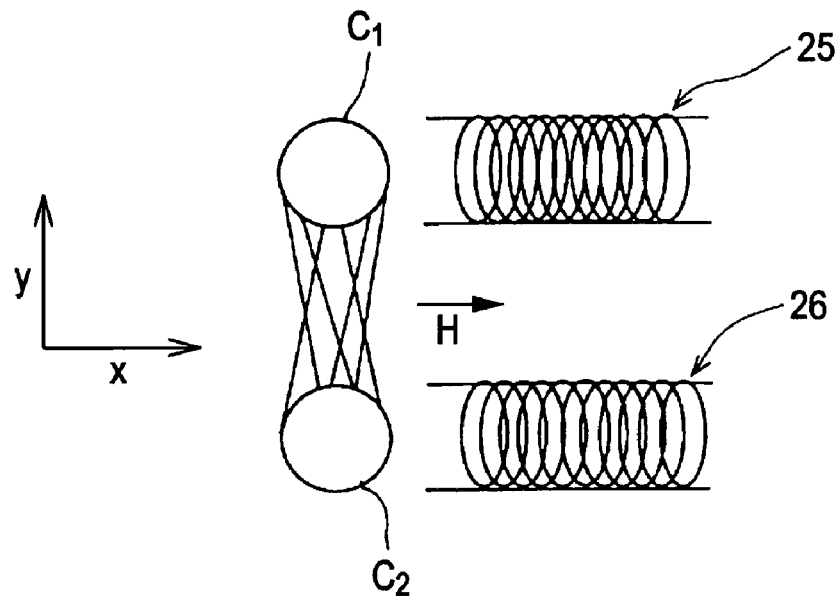
FIG. 25 is a schematic view showing an example of the trajectory of an irradiation part of an electron beam in Example 6.

An example of the trajectory of an irradiation part of the electron beam will now be described with reference to FIG. 25.

The electron beam of this example is irradiated in accordance with two circular deflection trajectories $C_1$ and $C_2$. In this case, areas 25 and 26 to be irradiated with the high-density energy beams 11 and 12, are irradiated in accordance with the circular deflection trajectories $C_1$ and $C_2$, respectively, while the workpiece is rotated around the central axis. Accordingly, the trajectories of the electron beam in the areas 25 and 26 to be heat-treated are moved in the direction shown by the arrow H.

Figure 26:
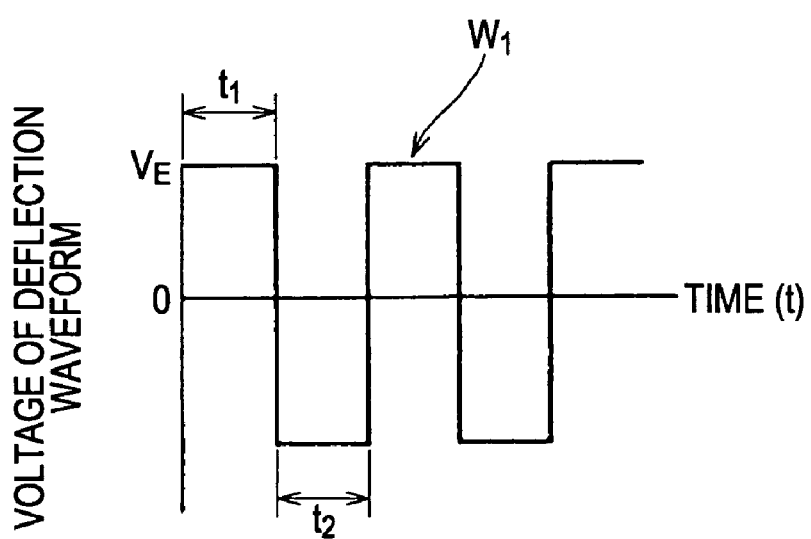
FIG. 26 is a graph showing an example of a deflection waveform of an electron beam in Example 6.

Each of the circular deflection trajectories $C_1$ and $C_2$ is formed by generating deflection waveforms of sine waves in the x-axis direction and in the y-axis direction, and combining the deflections. In order to alternately irradiate the areas 25 and 26 to be heat-treated with the electron beam by switching the circular deflection trajectories $C_1$ and $C_2$, a deflection waveform $w_1$ shown in FIG. 26 is generated, and the deflection waveform $w_1$ is overlapped with a deflection waveform in the y-axis direction.

Accordingly, during a time $t_1$ in which a voltage $V_E$ is a positive value, the area 25 is irradiated with the electron beam, and during a time $t_2$ in which the voltage $V_E$ is a negative value, the area 26 is irradiated with the electron beam.

Furthermore, by setting the time $t_1$ of the deflection waveform $w_1$ to be a small value and the time $t_2$ thereof to be a large value, the irradiation energy onto the areas 25 and 26 to be heat-treated can be adjusted.

For example, the abrasion resistance required for the flat plate part 411 of the lock-up clutch piston 41 is not as high as the abrasion resistance required for the projecting part 412. Accordingly, by setting the time $t_1$ of the deflection waveform $w_1$ to be a small value and the time $t_2$ thereof to be a large value, the hardness of the surface treatment area 401 can be controlled to be lower than that of the surface treatment area 402. Consequently, the energy consumed in the surface treatment can be reduced, and the processing time can also be further reduced.

Figure 27:
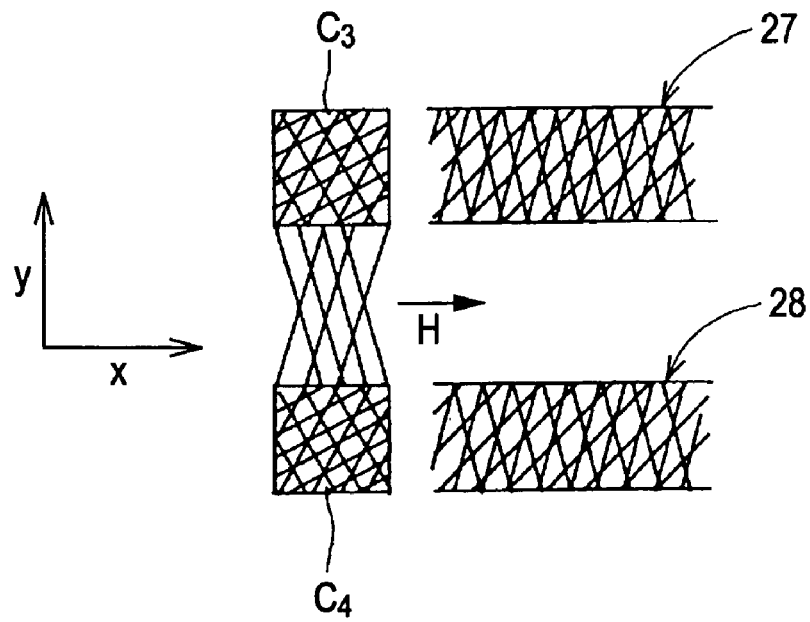
FIG. 27 is a schematic view showing another example of the trajectory of an irradiation part of an electron beam in Example 6.

Next, another example of a case in which an electron beam is irradiated onto areas 27 and 28, as shown in FIG. 27, will be described.

In this case, the electron beam is irradiated in accordance with two planar deflection trajectories $C_3$ and $C_4$. That is, the areas 27 and 28 are irradiated with the electron beam in accordance with the planar deflection trajectories $C_3$ and $C_4$, respectively, while the workpiece is rotated around the central axis. Accordingly, in this case, the trajectories of the electron beam in the areas 27 and 28 are also moved in the direction shown by the arrow H.

Figure 28:
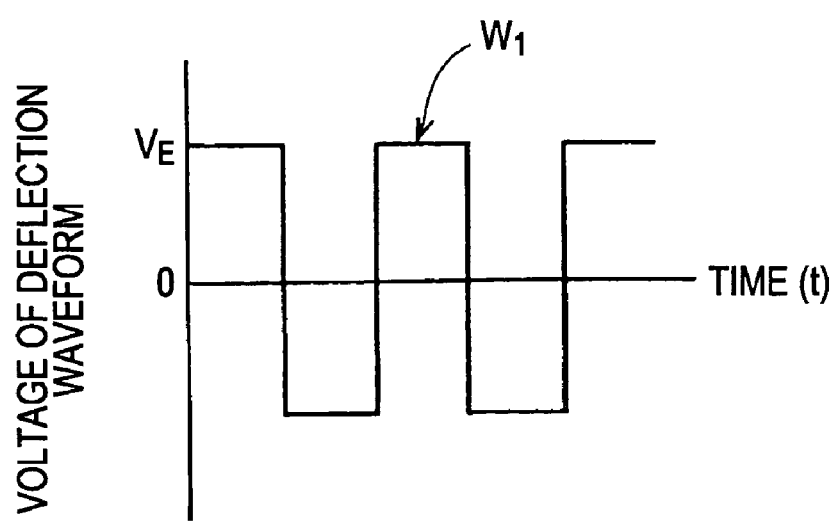
FIG. 28 is a graph showing an example of a deflection waveform of an electron beam in Example 6.

Each of the planar deflection trajectories $C_3$ and $C_4$ is formed by generating deflection voltages of triangular waves in the x-axis direction and in the y-axis direction. In order to irradiate areas 27 and 28 with the electron beam by switching the planar deflection trajectories $C_3$ and $C_4$, a deflection waveform $w_1$ shown in FIG. 28 is overlapped with the triangular waves in the x-axis direction and the y-axis direction.

Alternatively, a circular deflection and a planar deflection may be combined. An electron beam may also be deflected so as to form a trajectory of lines, ellipses, or the like.

In this example, the processing of a lock-up clutch piston of a torque converter has been described. However, an exemplary implementation can be applied to any steel member[s], such as a plate sliding part in a multidisc friction engaging device, a joined part between members or a joined part with a snap ring or the like, an oil pump plate, a seal ring groove, and so forth, as long as all or a part of the surface layer of the steel member is required to be hardened.

Example 7

Figure 29A:
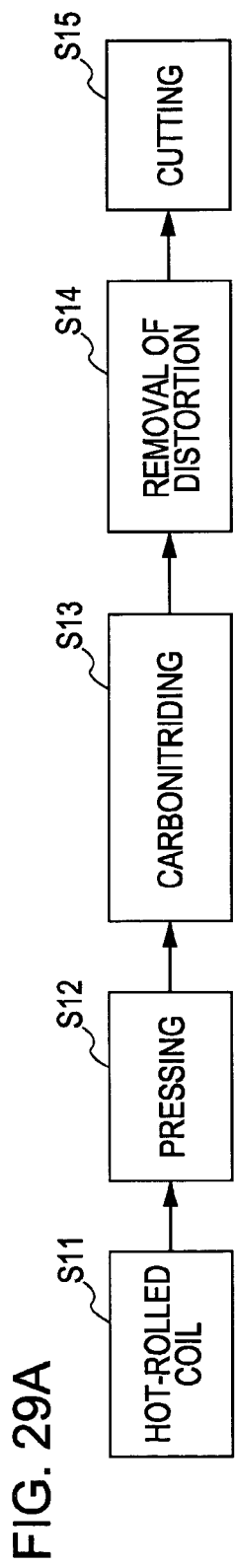
FIG. 29A is a flow diagram showing a known process in Example 7.
Figure 29B:
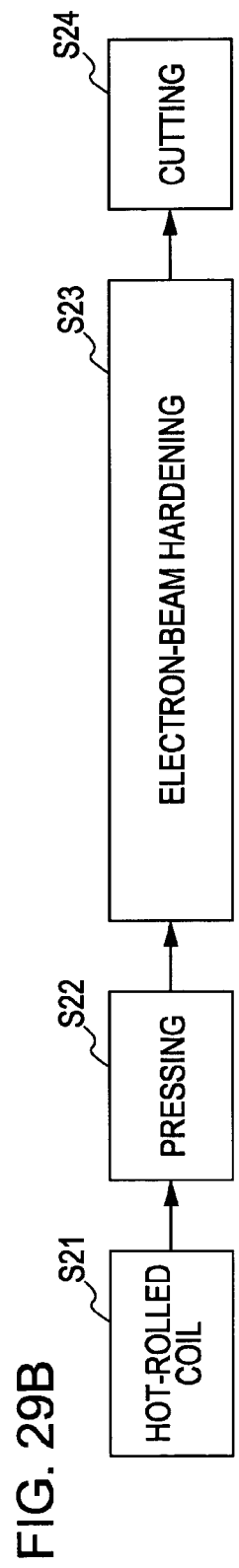
FIG. 29B is a flow diagram showing a reference process in Example 7.
Figure 29C:
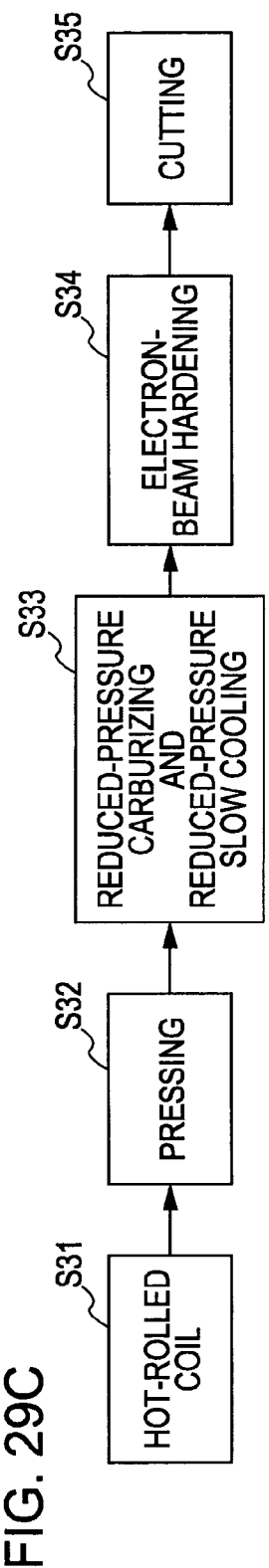
FIG. 29C is a flow diagram showing a process of the exemplary implementation in Example 7.

In this example, the lock-up clutch pistons described in Example 6 were produced by three types of production methods (heat-treatment method) shown in FIGS. 29A to 29C. In the prepared products, the hardness of the hardened layer before and after the heat treatment was measured.

As shown in FIG. 29A, a known process mainly includes five steps S11 to S15. Step S11 involves preparing a hot-rolled coil serving as a blank. Step S12 involves forming a lock-up clutch piston having a predetermined shape from the blank by pressing. Step S13 involves carbonitriding and hardening the lock-up clutch piston by a known general method. Step S14 involves removing distortions in which the distortion generated in the carbonitriding and hardening treatment is corrected. The last step S15 involves cutting, which is a finish machining step.

As shown in FIG. 29B, a reference process mainly includes four steps S21 to S24. Step S21 includes preparing a hot-rolled coil serving as a blank. Step S22 includes forming a lock-up clutch piston having a predetermined shape from the blank by pressing. These steps are the same as those in the above known process. Step S23 includes performing electron-beam hardening of areas where the hardened layer of the lock-up clutch piston is formed without performing carburization or a carbonitriding treatment. The last step S24 involves cutting, which is a finish machining step, and is performed without removing distortions in advance.

As shown in FIG. 29C, a process of an exemplary implementation mainly includes five steps S31 to S35, wherein a step including reduced-pressure carburizing and reduced-pressure slow cooling is added before step S23 of electron-beam hardening in the above referenced process. Specifically, step S31 involves preparing a hot-rolled coil serving as a blank, and step S32 involves forming a lock-up clutch piston having a predetermined shape from the blank by pressing. Step S33 involves performing the above-described reduced-pressure carburizing step and the reduced-pressure slow cooling step of an exemplary implementation. Step S34 involves performing electron-beam hardening of areas where the hardened layer of the lock-up clutch piston is formed. Finally, step S35 involves cutting, which is a finish machining step, and is performed without removing distortions in advance.

In this example, lock-up clutch pistons were produced by these three types of production methods, and the hardness of the cross-section of their hardened layer was measured.

In the lock-up clutch piston produced by the known process, a hot-rolled steel sheet JIS G 3113 SAPH (hereinafter simply referred to as "SAPH") was used as the material. In this known process, the hardened layer is formed on the surface of the entire product, but the hardness at the position corresponding to the above-described surface treatment area 402 shown in FIG. 23 was measured. The measurement results are denoted by C81 in FIG. 30. In the figure, the abscissa represents the distance from the surface, and the ordinate represents the hardness (Hv).

In the lock-up clutch pistons produced by the reference process and the process of an exemplary implementation, a boron steel containing, as chemical components: 0.2% to 0.25% of C, 0.10% to 0.25% of Si, 0.30% to 0.60% of Mn, 0.20% to 0.40% of Cr, and 0.0030% or more of B in terms of mass percent (hereinafter simply referred to as "boron steel") was used as the material. Steps S23 and S34 of electron-beam hardening was performed so that the molten part formed by the electron-beam irradiation had a depth of 10 μm. In these processes, since the hardened layer is locally formed, the hardness at the position corresponding to the surface treatment area 402 shown in FIG. 23 was measured. The measurement results of the lock-up clutch piston produced by the reference process are denoted by C82 in FIG. 30. The measurement results of the lock-up clutch piston produced by the process of the exemplary implementation are denoted by E81 in FIG. 30. For comparison, a lock-up clutch piston that was obtained immediately after step S32 in the process of an exemplary implementation, but that was not subjected to the heat treatment, was also prepared, and the hardness at the position corresponding to the surface treatment area 402 was measured. The measurement results are denoted by C83 in FIG. 30.

In all the cases, the hardness was measured with a micro Vickers hardness tester (50 g).

Figure 30:
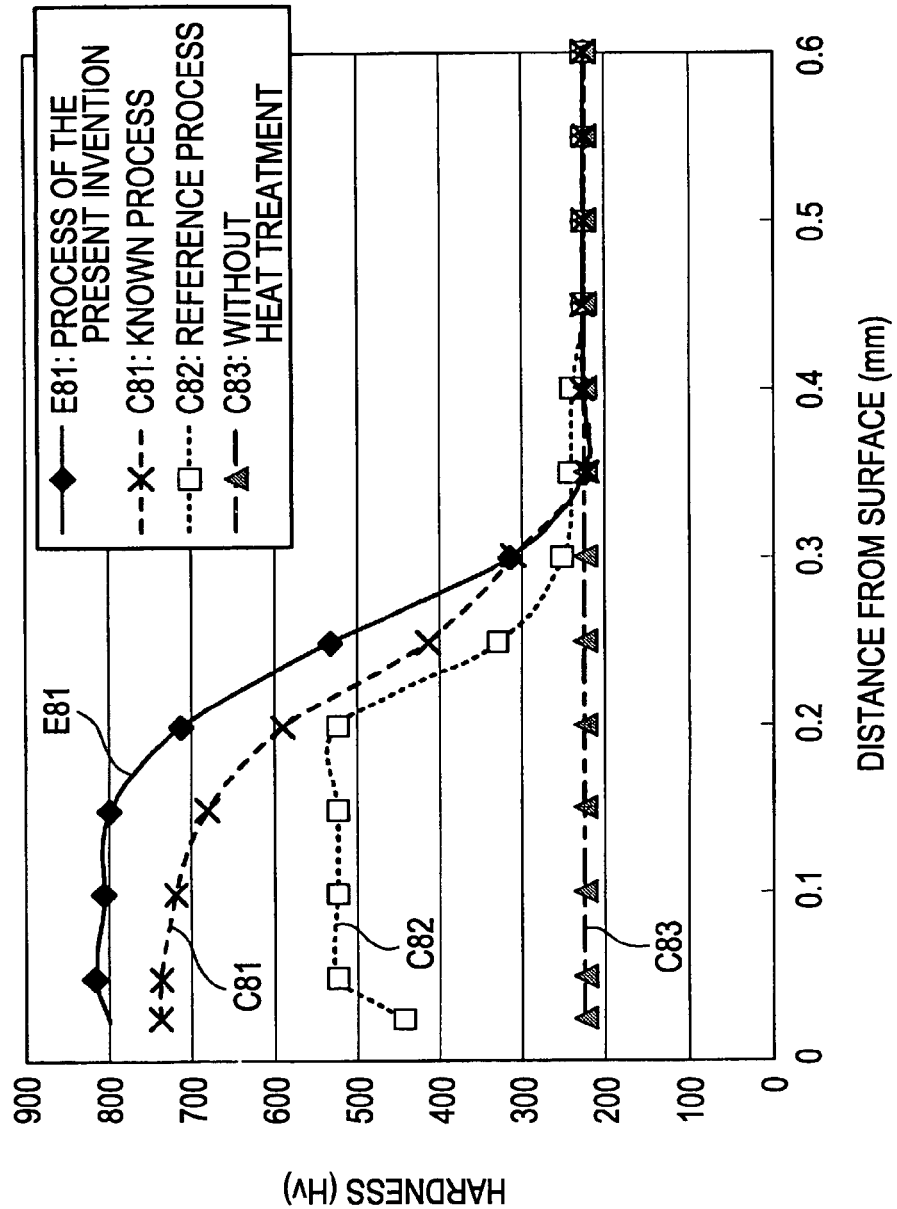
FIG. 30 is a graph showing exemplary measurement results of the hardness in Example 7.

As shown in FIG. 30, in each process, the surface hardness was higher than that of C83, which did not involve heat treatment. In particular, in the case of E81 of the exemplary implementation, the hardness was higher than that in C81 of the known process and C82 of the reference process. These results show that the exemplary implementation results in higher surface modification as compared to known methods, due to performing a reduced-pressure carburization, a reduced-pressure slow cooling, and a hardening with high-density energy. Additionally, as indicated by the comparison of the processes shown in FIGS. 29A to 29C, step S14 of removing distortions is essential in the known process, whereas this step can be omitted in an exemplary implementation by performing the slow cooling step and the electron-beam hardening step. Accordingly, the heat-treatment method of the exemplary implementation can achieve not only high hardness of a steel member, but also a significant process rationalization.

Example 8

Figure 31:
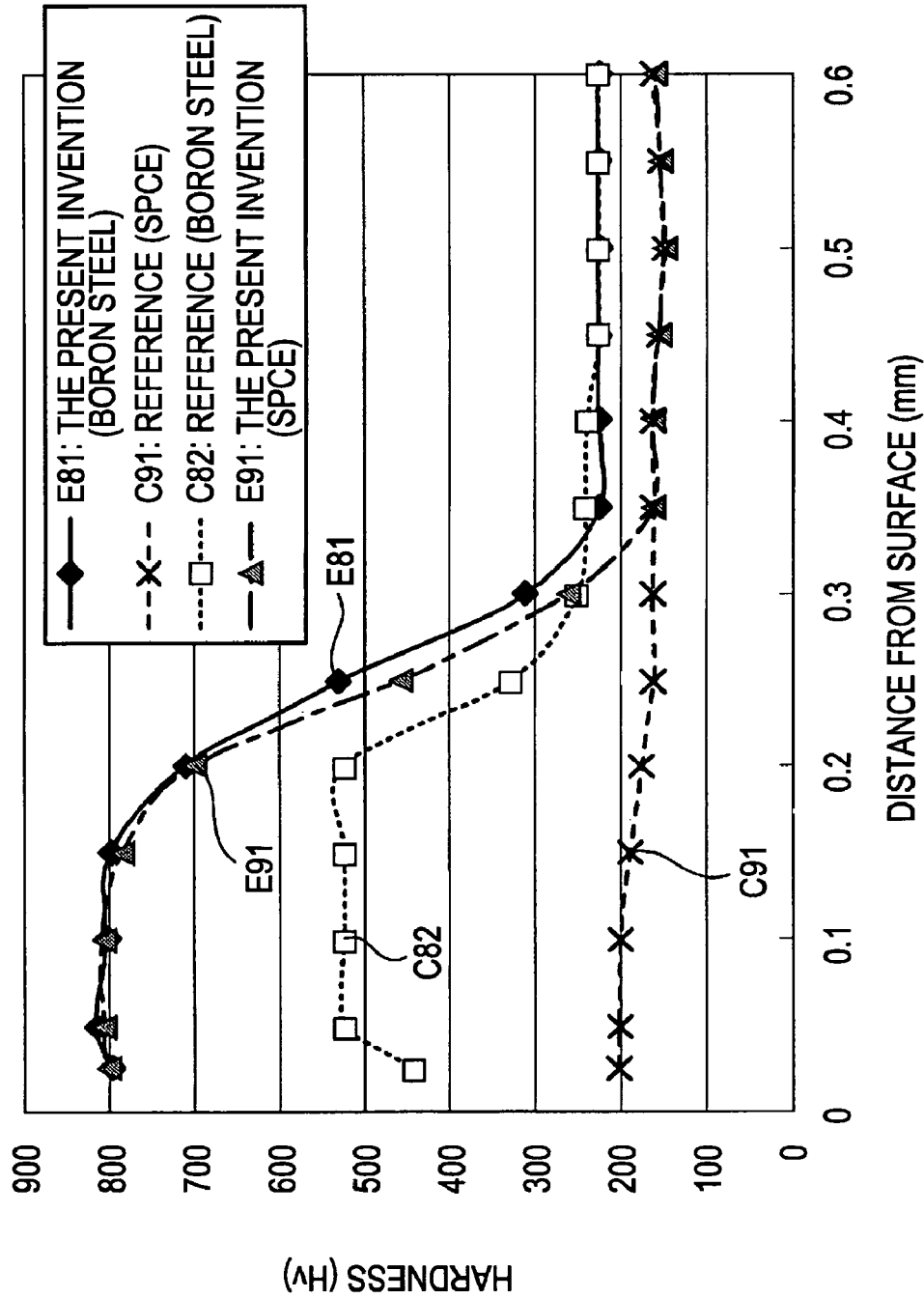
FIG. 31 is a graph showing exemplary measurement results of the hardness in Example 8.

In this example, the lock-up clutch pistons were produced by the process of an exemplary implementation and the reference process that are described in Example 7 using a cold-rolled steel sheet JIS G 3141 SPCE (hereinafter simply referred to as "SPCE"), and the hardness of their hardened layer was measured. In both processes, steps S23 and S34 of electron-beam hardening were performed so that the molten part formed by the electron-beam irradiation had a depth of 10 μm. The hardness at the position corresponding to the surface treatment area 402 shown in FIG. 23 was measured. The measurement results in the case where the process of an exemplary implementation was employed are denoted by E91 in FIG. 31. The measurement results in the case where the reference process was employed are denoted by C91 in FIG. 31. For reference, the results of E81 and C82 in Example 7 are also shown in FIG. 31.

As shown in the figure, in both materials, when reduced-pressure carburization and reduced-pressure slow cooling were performed prior to electron-beam hardening (E81 and E91), the effect of increasing the hardness was higher than in the cases where electron-beam hardening was performed without reduced-pressure carburization and reduced-pressure slow cooling (C82 and C91). In particular, in the case of the SPCE material, even when electron-beam hardening was performed without reduced-pressure carburization and reduced-pressure slow cooling, hardness is negligibly increased.

Example 9

This example describes the results of a test for examining the effect of the depth of the molten part formed during electron-beam hardening when an exemplary implementation or the reference process in Example 7 was employed.

The SPCE and the boron steel were used as the material. In each of the exemplary implementation and the reference process, two types of sample were prepared so that the depth of the molten part formed in the electron-beam hardening step was 10 μm and 50 μm.

In this example, for comparison, lock-up clutch pistons that were obtained immediately after step S32 in the process of an exemplary implementation and that were not subjected to the heat treatment were also prepared, and the hardness at the position corresponding to the surface treatment area 402 was measured.

The measurement results are shown in FIG. 32. In the figure, the abscissa represents the type of samples, and the ordinate represents the hardness (Hv). C101 to C104 denote samples that are obtained immediately after step S32 and that are not subjected to the heat treatment. C111 to C114 denote samples prepared by the reference process. E 101 to E104 denote samples prepared by the process of an exemplary implementation. In samples denoted by C101, C102, C111, C112, E101, and E102, the SPCE was used as the material. In other samples, the boron steel was used as the material.

As shown in FIG. 32, when electron-beam hardening was performed without first performing carburization, differences in the hardness were generated depending on the type of material used. In contrast, when carburization (the reduced-pressure carburization step and the reduced-pressure slow cooling step) was performed prior to electron-beam hardening, significant hardness increases can be achieved without significant variation across materials of different types.

According to an exemplary implementation, reduced-pressure carburization is used as the carburization treatment, heating using high-density energy and subsequent quenching is used as the hardening treatment, and a reduced-pressure cooling phase is actively introduced between the above two steps. Consequently, the same or a higher effect of carburizing and hardening can be achieved, and the generation of distortions and processing time can be markedly reduced as compared with known methods.

Specifically, exemplary implementations provide a reduced-pressure carburization step in which a steel member is carburized in a carburizing gas under a reduced pressure. In this reduced-pressure carburization, the carburization treatment can be performed with a relatively small amount of the carburizing gas, while the inside of a carburizing furnace at a high temperature is maintained at a reduced pressure. Therefore, the carburization treatment can be performed more efficiently as compared to known methods.

Hardening is performed in which a desired part of the steel member is heated using high-density energy and is then quenched. During this hardening only a desired part of the steel member, i.e., only a part where the strength is desired to be improved by the hardening, is rapidly heated utilizing a feature of the high-density energy and is then quenched. Consequently, the generation of distortions can be markedly suppressed, as compared to cases in which the whole steel member is hardened, such as in the known methods. Thus, the shape before the hardening step in the an exemplary implementation can be substantially maintained after hardening.

During hardening, strength can be increased by using the high-density energy. Since this increase in hardening can be achieved even when carburization is decreased, such carburization decreases can be compensated for by the increase in the hardening effect. Therefore, by combining the hardening step using the high-density energy and the reduced-pressure carburization step, the carburization treatment time can be reduced to increase process efficiency.

Examples of high-density energy include high-density energy beams such as electron beams and laser beams, and high-density energy applied by high-frequency heating.

Even when the above hardening step using high-density energy is employed to suppress distortions, i.e., in the case where the steel member itself is distorted before the hardening step, it is difficult to produce steel members with high dimensional accuracy. Interjecting a cooling step between reduced-pressure carburization and hardening solves this problem.

Specifically, in reduced-pressure cooling, the steel member is cooled in a cooling gas having a pressure that is lower than atmospheric pressure. Consequently, the generation of distortions of the steel member can be suppressed as compared with cases in which the steel member is cooled in a cooling gas having atmospheric pressure.

When the cooling gas is stirred during cooling, reducing the pressure of the cooling gas, causes a decrease in the difference in cooling rate between the windward and leeward of the circulating cooling gas as compared to cases in which the pressure of the cooling gas is atmospheric pressure. That is, when slow cooling is performed under atmospheric pressure, heat exchange proceeds when a steel member is merely brought into contact with the cooling gas. Active gas stirring or gas convection by heat thus forms on the windward and leeward of the gas, resulting in the difference in cooling rate. The difference in cooling rate causes a change in the temperature of the steel member, resulting in heat-treatment distortions. In contrast, when the pressure of the cooling gas is reduced, the rate of heat exchange is primarily low at both the windward and leeward of the gas. Accordingly, a difference in cooling rate is not easily generated. Therefore, when the pressure of the cooling gas is reduced, the generation of heat-treatment distortions can be suppressed because the cooling proceeds relatively uniformly. Furthermore, even when no stirring is performed, the difference in the cooling rate caused by cooling gas having different temperatures can be reduced under lower than atmospheric pressure.

By utilizing such effects obtained by reducing the pressure of the cooling gas, the generation of distortions can be suppressed, and the steel member can undergo subsequent hardening while maintaining a high dimensional accuracy. Consequently, the steel member having reduced distortions and a high accuracy can also be produced after hardening by utilizing the advantage of the above-described hardening step using the high-density energy.

Accordingly, the use of the heat-treatment method of the exemplary implementation can markedly suppress the generation of distortions, and efficiently achieve the effect of carburizing and hardening a steel member.

The invention claimed is:

1. A method of heat-treating a steel member comprising:
carburizing the steel member in a carburizing gas;
cooling the steel member at a slow cooling, after carburizing the steel member, in a cooling gas in which the pressure is in the range of about 0.1 to about 0.65 bar, until a temperature of the steel member is decreased to an $A_1$ transformation point or lower;
hardening only a part of the steel member where the strength is desired to be improved, not the whole steel member by heating using high-density energy and then quenching the part of the steel member to form a martensitic structure as a hardened layer;
wherein areas other than the hardened layer of the steel member are not transformed to martensite.

2. The method of heat-treating a steel member according to claim 1, wherein cooling the steel member occurs at least from a time before structural transformation of the steel member due to cooling is started to the time when structural transformation of the steel member is completed.

3. The method of heat-treating the steel member according to claim 1, wherein the pressure of the cooling gas during cooling of the steel member is in the range of 0.1 to 0.3 bar.

4. The method of heat-treating the steel member according to claim 1, wherein, the cooling the steel member is performed while increasing a stirring rate of the cooling gas after the temperature of the steel member is decreased to the $A_1$ transformation point or lower.

5. The method of heat-treating a steel member according to claim 1, wherein, cooling the steel member is performed while increasing the pressure of the cooling gas after the temperature of the steel member is decreased to the $A_1$ transformation point or lower.

6. The method of heat-treating a steel member according to claim 1, wherein carburizing the steel member occurs by heating the steel member to an austenitizing temperature or higher under a reduced pressure in the range of 0.001 to 0.1 bar.

7. The method of heat-treating the steel member according to claim 1, wherein hardening the steel member occurs by heating the desired part of the steel member to an austenitizing temperature, or higher, using high-density energy and then quenching the steel member.

8. The method of heat-treating the steel member according to claim 7, wherein the cooling rate of the quenching is in the range of 200 to 2,000° C./sec.

9. The method of heat-treating the steel member according to claim 7, wherein the steel member is heated by high-frequency heating.

10. The method of heat-treating the steel member according to claim 7, wherein quenching is performed by water quenching.

11. The method of heat-treating the steel member according to claim 7, wherein hardening occurs by heating the desired part of the steel member by irradiation of a high-density energy beam and then quenching by self-cooling.

12. The method of heat-treating the steel member according to claim 11, wherein the high-density energy beam is an electron beam.

13. The method of heat-treating the steel member according to claim 12, wherein the electron beam is irradiated onto the desired part of the steel member during hardening to heat only a surface layer to a melting point or higher, thereby forming a molten part, and wherein the molten part is then quenched to a martensitic transformation range to form a martensitic structure, thereby forming a hardened layer.

14. The method of heat-treating the steel member according to claim 13, wherein the hardened layer has a thickness of 0.2 mm or less.

15. The method of heat-treating the steel member according to claim 1, wherein the steel member comprises a non-heat-treated steel in which a high mechanical strength or a high hardness is obtained by precipitation hardening of vanadium carbonitride or transformation strengthening of a bainitic structure after carburization and cooling of the steel member occurs.

16. The method of heat-treating the steel member according to claim 1, wherein the steel member comprises a non-heat-treated steel in which a Vickers hardness Hv of an inside of the steel member, where carburization does not occur, increases by 50 to 150 units after carburization and cooling of the steel member occurs.

17. The method of heat-treating the steel member according to claim 1, wherein the steel member comprises, as chemical components: 0.1% to 0.6% of C, 0.1% to 0.6% of Si, 0.5% to 3.0% of Mn, 0.1% to 2.0% of Cr, 0% to 0.3% of Mo, 0% to 0.3% of V, and 0% to 0.05% of S in terms of mass percent, a balance being Fe and inevitable impurities.

18. The method of heat-treating the steel member according to claim 17, wherein the steel member comprises, as chemical components: 0.22% to 0.26% of C, 0.15% to 0.35% of Si, 1.40% to 1.60% of Mn, 0.40% to 0.60% of Cr, 0% to 0.3% of Mo, 0% to 0.3% of V, and 0% to 0.05% of S in terms of mass percent, the balance being Fe and inevitable impurities.

19. The method of heat-treating the steel member according to claim 17, wherein the steel member comprises, as chemical components: 0.11% to 0.15% of C, 0.15% to 0.35% of Si, 2.10% to 2.30% of Mn, 0.90% to 1.10% of Cr, 0% to 0.3% of Mo, 0% to 0.3% of V, and 0% to 0.05% of S in terms of mass percent, the balance being Fe and inevitable impurities.

20. The method of heat-treating the steel member according to claim 1, wherein the steel member comprises, as chemical components: 0.2% to 0.3% of C, 0.2% to 0.6% of Si, 1.4% to 2.0% of Mn, 0.2% to 0.6% of Cr, 0% to 0.4% of Mo, 0.05% to 0.25% of V, and 0% to 0.05% of S in terms of mass percent, the balance being Fe and inevitable impurities.

21. The method of heat-treating the steel member according to claim 20, wherein the steel member comprises, as chemical components: 0.2% to 0.3% of C, 0.4% to 0.6% of Si, 1.4% to 2.0% of Mn, 0.4% to 0.6% of Cr, 0% to 0.1% of Mo, 0.05% to 0.25% of V, and 0% to 0.05% of S in terms of mass percent, the balance being Fe and inevitable impurities.

22. The method of heat-treating the steel member according to claim 20, wherein the steel member comprises, as chemical components: 0.2% to 0.3% of C, 0.4% to 0.6% of Si, 1.4% to 2.0% of Mn, 0.4% to 0.6% of Cr, 0.3% to 0.4% of Mo, 0.05% to 0.25% of V, and 0% to 0.05% of S in terms of mass percent, the balance being Fe and inevitable impurities.

23. The method of heat-treating the steel member according to claim 1, wherein the steel member is a part of a driving system of an automobile.

24. The method of heat-treating the steel member according to claim 1, wherein:
the steel member is a lock-up clutch piston that is installed, together with springs, in a lock-up clutch unit in a torque converter,
the lock-up clutch piston comprises a disc-shaped flat plate part and a cylindrical part projecting from the flat plate part in an axial direction, and
a hardened layer is formed on the flat plate part and the cylindrical part during hardening of the steel member.

25. A method of producing the steel member comprising: forming a steel member into a desired shape, and then performing the heat-treatment method according to claim 1.

* * * * *